United States Patent
Figiel

(10) Patent No.: US 9,534,970 B1
(45) Date of Patent: Jan. 3, 2017

(54) MONITORING OSCILLATING COMPONENTS

(71) Applicant: INTERNATIONAL PAPER COMPANY, Memphis, TN (US)

(72) Inventor: Kerry D. Figiel, Cincinnati, OH (US)

(73) Assignee: INTERNATIONAL PAPER COMPANY, Memphis, TN (US)

( * ) Notice: Subject to any disclaimer, the term of this patent is extended or adjusted under 35 U.S.C. 154(b) by 0 days.

(21) Appl. No.: 14/736,010

(22) Filed: Jun. 10, 2015

(51) Int. Cl.
*G01L 5/00* (2006.01)
*B65H 19/22* (2006.01)

(52) U.S. Cl.
CPC ......... *G01L 5/0085* (2013.01); *B65H 19/2238* (2013.01); *B65H 19/2276* (2013.01)

(58) Field of Classification Search
CPC ............. B65H 19/2238; B65H 19/2276; G01L 5/0085; D21G 3/005; B41F 13/30
USPC .................. 73/159, 862.55, 862.632; 702/41
See application file for complete search history.

(56) References Cited

U.S. PATENT DOCUMENTS

| | | |
|---|---|---|
| 757,221 A | 4/1904 | Partridge |
| 2,300,909 A | 11/1942 | Broughton |
| 3,622,448 A | 11/1971 | Adams et al. |
| 3,673,865 A | 7/1972 | Michaelsen |
| 3,794,427 A | 2/1974 | Shibata et al. |
| 3,840,302 A | 10/1974 | Brunton et al. |
| 3,863,453 A | 2/1975 | Mercier |
| 3,936,665 A | 2/1976 | Donoghue |
| 3,989,085 A | 11/1976 | Crosby |
| 4,019,066 A | 4/1977 | Lucas et al. |
| 4,059,794 A | 11/1977 | Furness et al. |
| 4,090,205 A * | 5/1978 | Huffman ................ G01D 15/18 346/104 |
| 4,092,068 A | 5/1978 | Lucas et al. |
| 4,152,202 A | 5/1979 | DeLigt |

(Continued)

FOREIGN PATENT DOCUMENTS

| | | |
|---|---|---|
| EP | 1653207 | 5/2006 |
| EP | 2641857 | 12/2015 |

(Continued)

OTHER PUBLICATIONS

Sasaki et al., In-Roll Stress Analysis Considering Air-Entrainment at the Roll-Inlet with the Effect of Grooves on Nip Roll Surface, 2008, pp. 133-145, vol. 2, No. 1, Journal of Advanced Mechanical Design, Systems, and Manufacturing.

*Primary Examiner* — Max Noori
(74) *Attorney, Agent, or Firm* — Thomas W. Barnes, III

(57) ABSTRACT

A sensor signal is generated from a plurality of sensors located on a sensing roll, wherein each signal is generated when each sensor enters a nip between the sensing roll and a mating roll during each rotation of the sensing roll. An oscillating component such as a doctor blade or cleaning shower affects a web of material upstream from the nip. Each sensor generates a sensor signal upon entering the nip. A periodically occurring starting reference is generated that is associated with each oscillation of the oscillating component and the signal generated by each sensor is received so that a particular one of the sensors which generated the signal is determined and one of a plurality of tracking segments associated with the oscillating component is identified. The signal is stored to associate the sensor signal with the identified one tracking segment.

24 Claims, 29 Drawing Sheets

(56) References Cited

U.S. PATENT DOCUMENTS

| | | | |
|---|---|---|---|
| 4,233,011 | A | 11/1980 | Bolender et al. |
| 4,423,636 | A | 1/1984 | Plante |
| 4,495,587 | A | 1/1985 | Plante et al. |
| 4,509,237 | A | 4/1985 | Volz et al. |
| 4,524,546 | A | 6/1985 | Hoover et al. |
| 4,729,153 | A | 3/1988 | Pav et al. |
| 4,879,471 | A | 11/1989 | Dahlquist |
| 4,898,012 | A | 2/1990 | Jones et al. |
| 4,903,528 | A | 2/1990 | Balakrishnan et al. |
| 4,921,574 | A | 5/1990 | Hu |
| 4,947,684 | A | 8/1990 | Balakrishnan |
| 5,022,966 | A | 6/1991 | Hu |
| 5,048,353 | A | 9/1991 | Justus |
| 5,121,332 | A | 6/1992 | Balakrishnan et al. |
| 5,122,963 | A | 6/1992 | Chen |
| 5,125,746 | A | 6/1992 | Lipshitz |
| 5,358,606 | A | 10/1994 | Makkonen |
| 5,379,652 | A | 1/1995 | Allonen |
| 5,383,371 | A | 1/1995 | Laitinen |
| 5,400,258 | A | 3/1995 | He |
| 5,562,027 | A * | 10/1996 | Moore ............... D21F 3/06 100/176 |
| 5,563,809 | A | 10/1996 | Williams et al. |
| 5,699,729 | A | 12/1997 | Moschel |
| 5,725,737 | A | 3/1998 | Pikulik et al. |
| 5,743,177 | A | 4/1998 | Wostbrock |
| 5,745,365 | A | 4/1998 | Parker |
| 5,960,374 | A | 9/1999 | Lausier |
| 6,152,720 | A | 11/2000 | Greb et al. |
| 6,336,078 | B1 | 1/2002 | Sakayori et al. |
| 6,356,846 | B1 | 3/2002 | Habeger, Jr. et al. |
| 6,411,860 | B1 | 6/2002 | Chen |
| 6,482,339 | B1 | 11/2002 | Greb et al. |
| 6,519,552 | B1 | 2/2003 | Sampath et al. |
| 6,567,720 | B1 * | 5/2003 | Figiel ............... G01N 33/346 162/198 |
| 6,568,285 | B1 | 5/2003 | Moore et al. |
| 6,769,314 | B2 | 8/2004 | Moore |
| 6,805,899 | B2 | 10/2004 | MacHattie et al. |
| 6,849,851 | B2 | 2/2005 | Komulainen et al. |
| 6,925,279 | B2 | 8/2005 | Kamoshita |
| 6,934,028 | B2 | 8/2005 | Ho et al. |
| 6,950,777 | B1 | 9/2005 | Lilburn et al. |
| 7,018,708 | B2 | 3/2006 | Song et al. |
| 7,127,315 | B2 | 10/2006 | Junge et al. |
| 7,155,356 | B2 | 12/2006 | Mantyla et al. |
| 7,185,537 | B2 | 3/2007 | Muhs |
| 7,225,688 | B2 | 6/2007 | Moore et al. |
| 7,261,680 | B2 | 8/2007 | Lutz |
| 7,294,234 | B2 | 11/2007 | Munch et al. |
| 7,305,894 | B2 | 12/2007 | Moore et al. |
| 7,392,715 | B2 | 7/2008 | Moore et al. |
| 7,406,876 | B2 | 8/2008 | Krozer |
| 7,430,887 | B2 * | 10/2008 | Mucke ............... B21B 38/02 33/533 |
| 7,444,862 | B2 | 11/2008 | Innala et al. |
| 7,581,456 | B2 | 9/2009 | Moore et al. |
| 7,582,188 | B2 | 9/2009 | Stoffel et al. |
| 7,608,166 | B2 | 10/2009 | Huang et al. |
| 7,608,338 | B2 | 10/2009 | Song et al. |
| 7,629,799 | B2 | 12/2009 | Murphy |
| 7,736,466 | B2 | 6/2010 | Singh et al. |
| 7,745,525 | B2 | 6/2010 | Koenig |
| 7,815,770 | B2 | 10/2010 | Huang et al. |
| 7,828,935 | B2 | 11/2010 | Huang et al. |
| 7,963,180 | B2 | 6/2011 | Moore et al. |
| 7,967,953 | B2 | 6/2011 | Singh et al. |
| 8,007,920 | B2 | 8/2011 | Song et al. |
| 8,012,551 | B2 | 9/2011 | Song et al. |
| 8,123,907 | B2 | 2/2012 | Stoffel et al. |
| 8,236,141 | B2 | 8/2012 | Pak |
| 8,292,295 | B2 | 10/2012 | Ohshima et al. |
| 8,361,573 | B2 | 1/2013 | Koenig |
| 8,372,243 | B2 | 2/2013 | Singh et al. |
| 8,382,946 | B2 | 2/2013 | Song et al. |
| 8,440,053 | B2 | 5/2013 | Koenig et al. |
| 8,474,333 | B2 | 7/2013 | Berendes |
| 8,475,347 | B2 | 7/2013 | Gustafson et al. |
| 8,540,241 | B2 | 9/2013 | Sugahara |
| 8,574,690 | B2 | 11/2013 | Koenig et al. |
| 8,586,156 | B2 | 11/2013 | Koenig et al. |
| 8,586,279 | B2 | 11/2013 | Williams et al. |
| 8,586,280 | B2 | 11/2013 | Williams et al. |
| 8,608,908 | B2 | 12/2013 | Koenig et al. |
| 8,652,593 | B2 | 2/2014 | Koenig |
| 8,652,594 | B2 | 2/2014 | Koenig et al. |
| 8,697,203 | B2 | 4/2014 | Koenig |
| 8,758,565 | B2 | 6/2014 | Singh et al. |
| 8,758,886 | B2 | 6/2014 | Koenig et al. |
| 8,795,796 | B2 | 8/2014 | Koenig |
| 9,121,686 | B2 | 9/2015 | Gustafson |
| 2004/0237665 | A1 | 12/2004 | Mucke et al. |
| 2005/0208878 | A1 | 9/2005 | Weiss |
| 2006/0090574 | A1 * | 5/2006 | Moore ............... G01L 5/0085 73/862.55 |
| 2006/0248723 | A1 | 11/2006 | Gustafson |
| 2007/0006644 | A1 | 1/2007 | Schultheis |
| 2008/0087073 | A1 | 4/2008 | Ulfert et al. |
| 2010/0071480 | A1 * | 3/2010 | Pietikainen ......... G01L 5/045 73/862.55 |
| 2010/0125428 | A1 | 5/2010 | Moore |
| 2011/0301003 | A1 * | 12/2011 | Gustafson ............ D21F 3/06 492/10 |
| 2012/0310596 | A1 | 12/2012 | Gustafson et al. |
| 2013/0185015 | A1 | 7/2013 | Cantrell |
| 2014/0257719 | A1 | 9/2014 | Figiel |
| 2014/0352882 | A1 | 12/2014 | Nash et al. |
| 2015/0316429 | A1 | 11/2015 | Figiel |
| 2015/0316430 | A1 | 11/2015 | Figiel |
| 2015/0316432 | A1 | 11/2015 | Figiel |
| 2016/0038969 | A1 | 2/2016 | Schmitt |

FOREIGN PATENT DOCUMENTS

| WO | 9113337 | 9/1991 |
| WO | 9625288 | 8/1996 |
| WO | 2005113891 | 12/2005 |
| WO | WO-2008/155461 | 12/2008 |
| WO | WO-2009/092761 | 7/2009 |
| WO | 2011107660 | 9/2011 |

* cited by examiner

| | | |
|---|---:|---:|
| 34 | 2.94036E-15 | 12 |
| 35 | -2.253860455 | 13 |
| 36 | -4.32512654 | 14 |
| 37 | -6.45996595 | 15 |
| 38 | -7.277055963 | 16 |
| 39 | -7.918571535 | 17 |
| 40 | -7.918571535 | 18 |
| 41 | -7.277055963 | 19 |
| 42 | -6.045996595 | 20 |
| 43 | -4.32512654 | 21 |
| 44 | -2.253860455 | 22 |
| 45 | -1.81313E-14 | 1 |
| 46 | 2.253860455 | 2 |
| 47 | 4.32512654 | 3 |
| 48 | 6.045996595 | 4 |
| 49 | 7.277055963 | 5 |
| 50 | 7.918571535 | 6 |
| 51 | 7.918571535 | 7 | continued from FIG. 4A continued from FIG. 4A

FIG. 4B

|  | \~100 | | | | | | |
|---|---|---|---|---|---|---|---|
| AXIAL SENSOR NUMBER | 1 | 2 | 3 | 4 | ... | 14 | |
| CIRCUMFERENTIAL SEGMENT 1 | | | | | | | |
| 2 | | | | | | | |
| 3 | | | | | | | |
| 4 | | | | | | | |
| ... | | | | | | | |
| 22 | | | | | | | |

COUNTS MATRIX

FIG. 6

| CIRCUMFERENTIAL SEGMENT | AXIAL SENSOR NUMBER | | | | | | |
|---|---|---|---|---|---|---|---|
| | 1 | 2 | 3 | 4 | ... | 14 | |
| 1 | | | | | | | ← 200 |
| 2 | | | | | | | |
| 3 | | | | | | | |
| 4 | | | | | | | |
| ... | | | | | | | |
| 22 | | | | | | | |

SUM OF PRESSURE READINGS MATRIX

FIG. 7

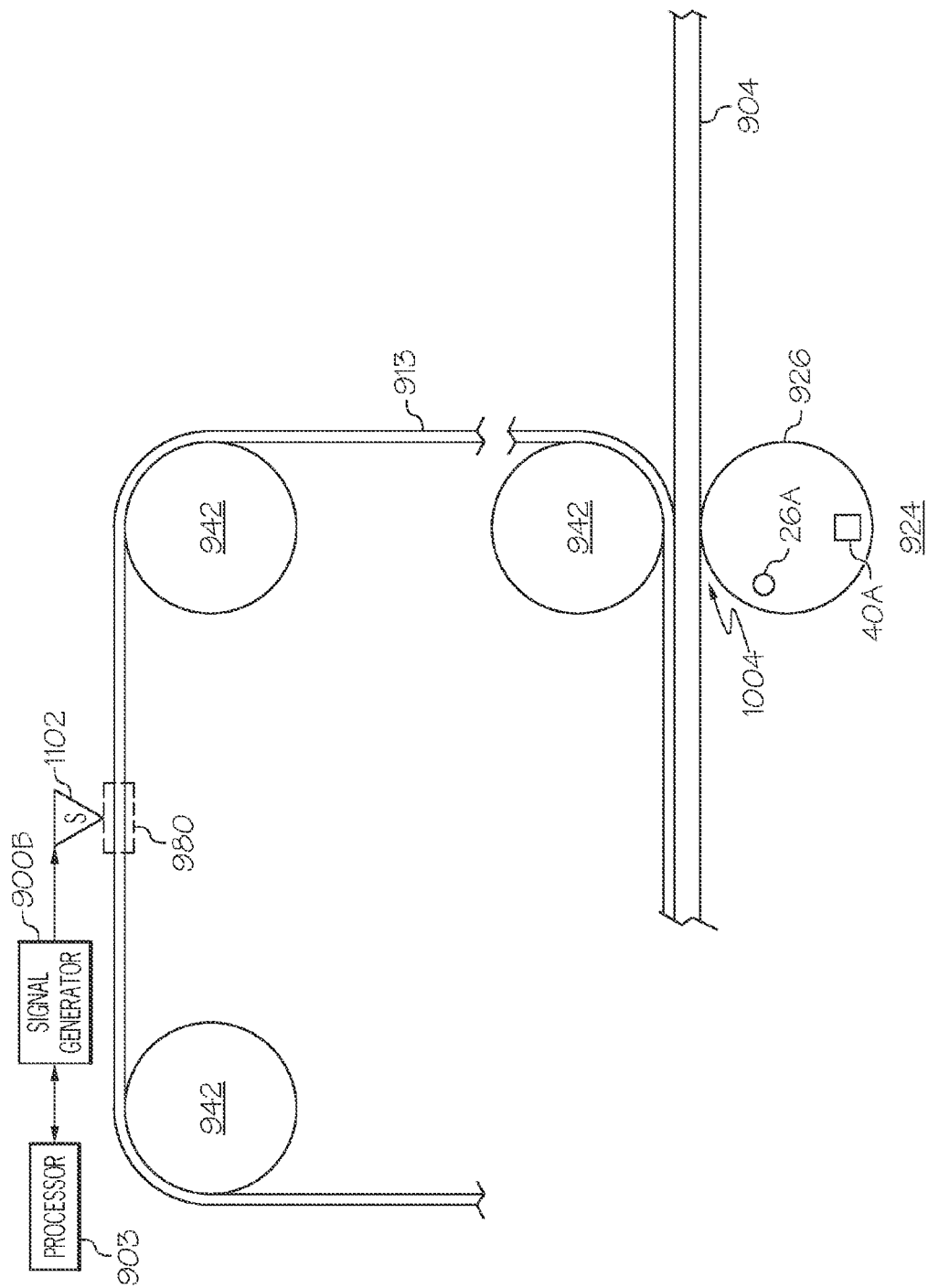

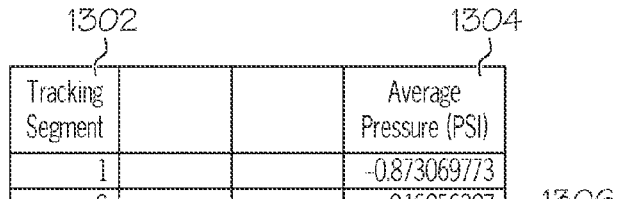
FIG. 13A(1)

| | | | |
|---|---|---|---|
| 36 | | | -4.726115464 |
| 37 | | | -5.227119544 |
| 38 | | | -5.431783978 |
| 39 | | | -5.314237449 |
| 40 | | | -4.874595959 |
| 41 | | | -4.138962722 |
| 42 | | | -3.157322818 |
| 43 | | | -1.999503193 |
| 44 | | | -0.749525258 |
| 45 | | | 0.501192367 |
| 46 | | | 1.661230336 |
| 47 | | | 2.646565044 |
| 48 | | | 3.387365903 |
| 49 | | | 3.833642731 |
| 50 | | | 3.959285768 |
| 51 | | | 3.638527981 |
| 52 | | | 3.022998297 |
| 53 | | | 2.16256327 |
| 54 | | | 1.126930227 |
| 55 | | | -4.65513E-15 |
| 56 | | | -1.126930227 |
| 57 | | | -2.16256327 |
| 58 | | | -3.022998297 |
| 59 | | | -3.638527981 |
| 60 | | | -3.959285768 |
| 61 | | | -3.959285768 |
| 62 | | | -3.638527981 |
| 63 | | | -3.022998297 |
| 64 | | | -2.16256327 |
| 65 | | | -1.126930227 |
| 66 | | | -2.94036E-15 |
| 67 | | | 1.126930227 |
| 68 | | | 2.16256327 |
| 69 | | | 3.022998297 |
| 70 | | | 3.638527981 |

FIG. 13A(2)

continued from FIG. 13A2 continued from FIG. 13A2

| | | | |
|---|---|---|---|
| 71 | | | 3.959285768 |
| 72 | | | 3.959285768 |
| 73 | | | 3.638527981 |
| 74 | | | 3.022998297 |
| 75 | | | 2.16256327 |
| 76 | | | 1.126930227 |
| 77 | | | 3.43042E-15 |
| 78 | | | -1.126930227 |
| 79 | | | -2.16256327 |
| 80 | | | -3.022998297 |
| 81 | | | -3.638527981 |
| 82 | | | -3.959285768 |
| 83 | | | -3.959285768 |
| 84 | | | -3.638527981 |
| 85 | | | -3.022998297 |
| 86 | | | -2.16256327 |
| 87 | | | -1.126930227 |
| 88 | | | -1.81313E-14 |
| 89 | | | 1.126930227 |
| 90 | | | 2.16256327 |
| 91 | | | 3.022998297 |
| 92 | | | 3.638527981 |
| 93 | | | 3.959285768 |
| 94 | | | 3.959285768 |
| 95 | | | 3.638527981 |
| 96 | | | 3.022998297 |
| 97 | | | 2.16256327 |
| 98 | | | 1.126930227 |
| 99 | | | -9.80032E-15 |
| 100 | | | -1.126930227 |
| 101 | | | -2.16256327 |
| 102 | | | -3.022998297 |
| 103 | | | -3.638527981 |
| 104 | | | -3.959285768 |
| 105 | | | -3.959285768 | continued to FIG. 13A4 continued to FIG. 13A4

FIG. 13A(3)

continued from FIG. 13A3 ④ continued from FIG. 13A3 ④

| | | | |
|---|---|---|---|
| 106 | | | -3.638527981 |
| 107 | | | -3.022998297 |
| 108 | | | -2.16256327 |
| 109 | | | -1.126930227 |
| 110 | | | 9.31026E-15 |
| 111 | | | 1.126930227 |
| 112 | | | 2.16256327 |
| 113 | | | 3.022998297 |
| 114 | | | 3.638527981 |
| 115 | | | 3.959285768 |
| 116 | | | 3.959285768 |
| 117 | | | 3.638527981 |
| 118 | | | 3.022998297 |
| 119 | | | 2.16256327 |
| 120 | | | 1.126930227 |
| 121 | | | -8.8202E-15 |
| 122 | | | -1.126930227 |
| 123 | | | -2.16256327 |
| 124 | | | -3.022998297 |
| 125 | | | -3.638527981 |
| 126 | | | -3.959285768 |
| 127 | | | -3.959285768 |
| 128 | | | -3.638527981 |
| 129 | | | -3.022998297 |
| 130 | | | -2.16256327 |
| 131 | | | -1.126930227 |
| 132 | | | -5.88071E-15 |
| 133 | | | 1.126930227 |
| 134 | | | 2.16256327 |
| 135 | | | 3.022998297 |
| 136 | | | 3.638527981 |
| 137 | | | 3.959285768 |
| 138 | | | 3.959285768 |
| 139 | | | 3.638527981 |
| 140 | | | 3.022998297 | continued to FIG. 13A5 ⑤ continued to FIG. 13A5 ⑤

FIG. 13A(4)

continued from FIG. 13A4 ⑤

| | | | |
|---|---|---|---|
| 141 | | | 2.16256327 |
| 142 | | | 1.126930227 |
| 143 | | | -7.84008E-15 |
| 144 | | | 1.126930227 |
| 145 | | | -2.16256327 |
| 146 | | | 3.022998297 |
| 147 | | | 3.638527981 |
| 148 | | | 3.959285768 |
| 149 | | | 3.959285768 |
| 150 | | | 3.638527981 |
| 151 | | | 3.148641334 |
| 152 | | | 2.413725348 |
| 153 | | | 1.503363481 |
| 154 | | | 0.501332934 |
| 155 | | | 0.501192367 |
| 156 | | | 1.413038011 |
| 157 | | | 2.150425332 |
| 158 | | | 2.643768433 |
| 159 | | | 2.843321343 |
| 160 | | | 2.72321779 |
| 161 | | | 2.2835763 |
| 162 | | | 1.550500087 |
| 163 | | | 0.573971707 |
| 164 | | | 0.576186939 |
| 165 | | | 1.815961999 |
| 166 | | | 3.053944924 |
| 167 | | | -4.16256327 |
| 168 | | | 5.022998297 |
| 169 | | | 5.638527981 |
| 170 | | | 5.959285768 |
| 171 | | | 5.959285768 |
| 172 | | | 5.638527981 |
| 173 | | | 5.022998297 |
| 174 | | | -4.16256327 |
| 175 | | | 3.126930227 | continued to FIG. 13A6 ⑥

FIG. 13A(5)

| | | | |
|---|---|---|---|
| 176 | | | -2 |
| 177 | | | -0.873069773 |
| 178 | | | 0.16256327 |
| 179 | | | 1.022998297 |
| 180 | | | 1.638527981 |
| 181 | | | 1.959285768 |
| 182 | | | 1.959285768 |
| 183 | | | 1.638527981 |
| 184 | | | 1.022998297 |
| 185 | | | 0.16256327 |
| 186 | | | -0.873069773 |
| 187 | | | -2 |
| 188 | | | -3.126930227 |
| 189 | | | -4.16256327 |
| 190 | | | -5.022998297 |
| 191 | | | -5.638527981 |
| 192 | | | -5.959285768 |
| 193 | | | -5.959285768 |
| 194 | | | -5.638527981 |
| 195 | | | -5.022998297 |
| 196 | | | -4.16256327 |
| 197 | | | -3.126930227 |
| 198 | | | -2 |
| 199 | | | -0.873069773 |
| 200 | | | 0.16256327 |

FIG. 13A(6)

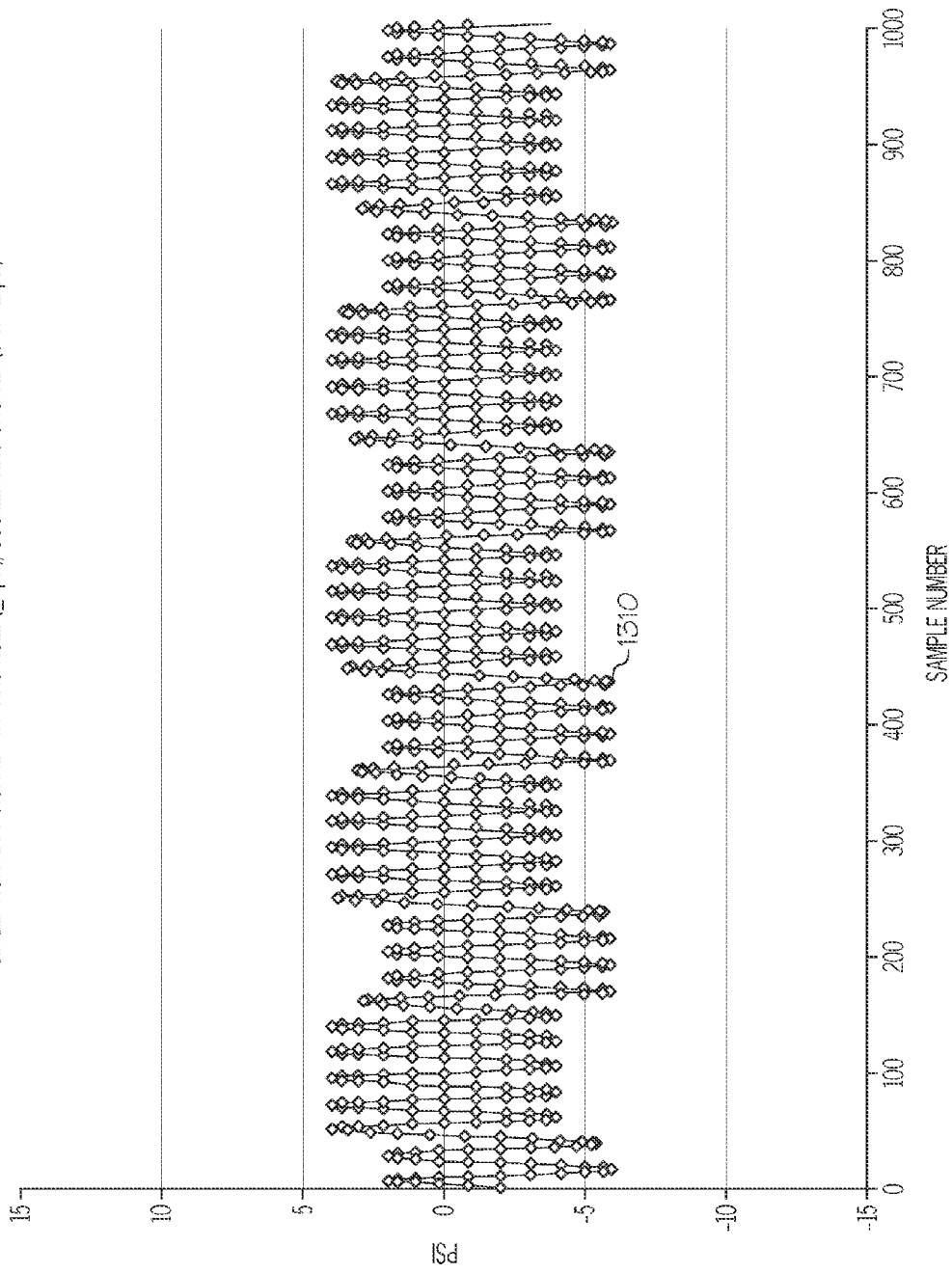

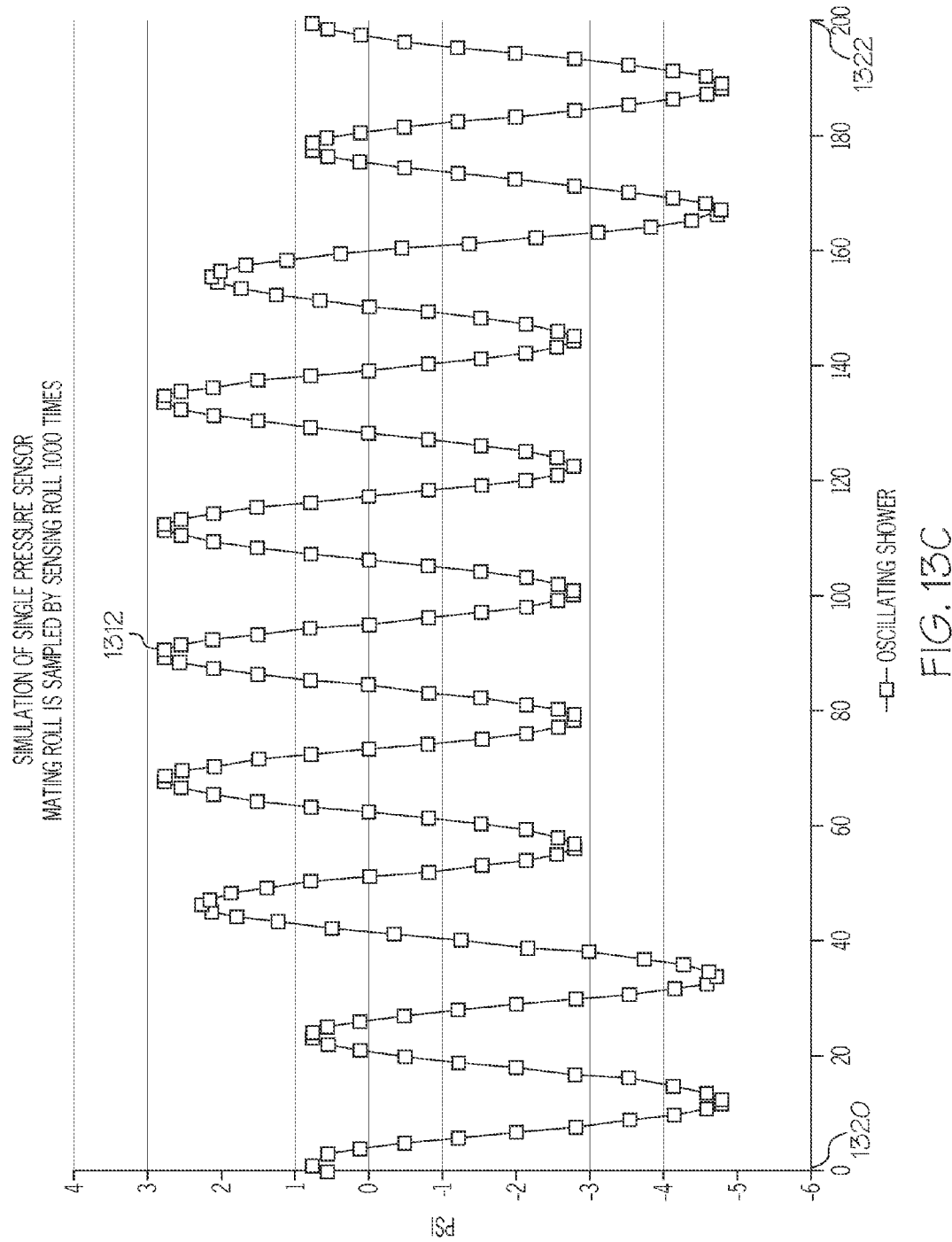

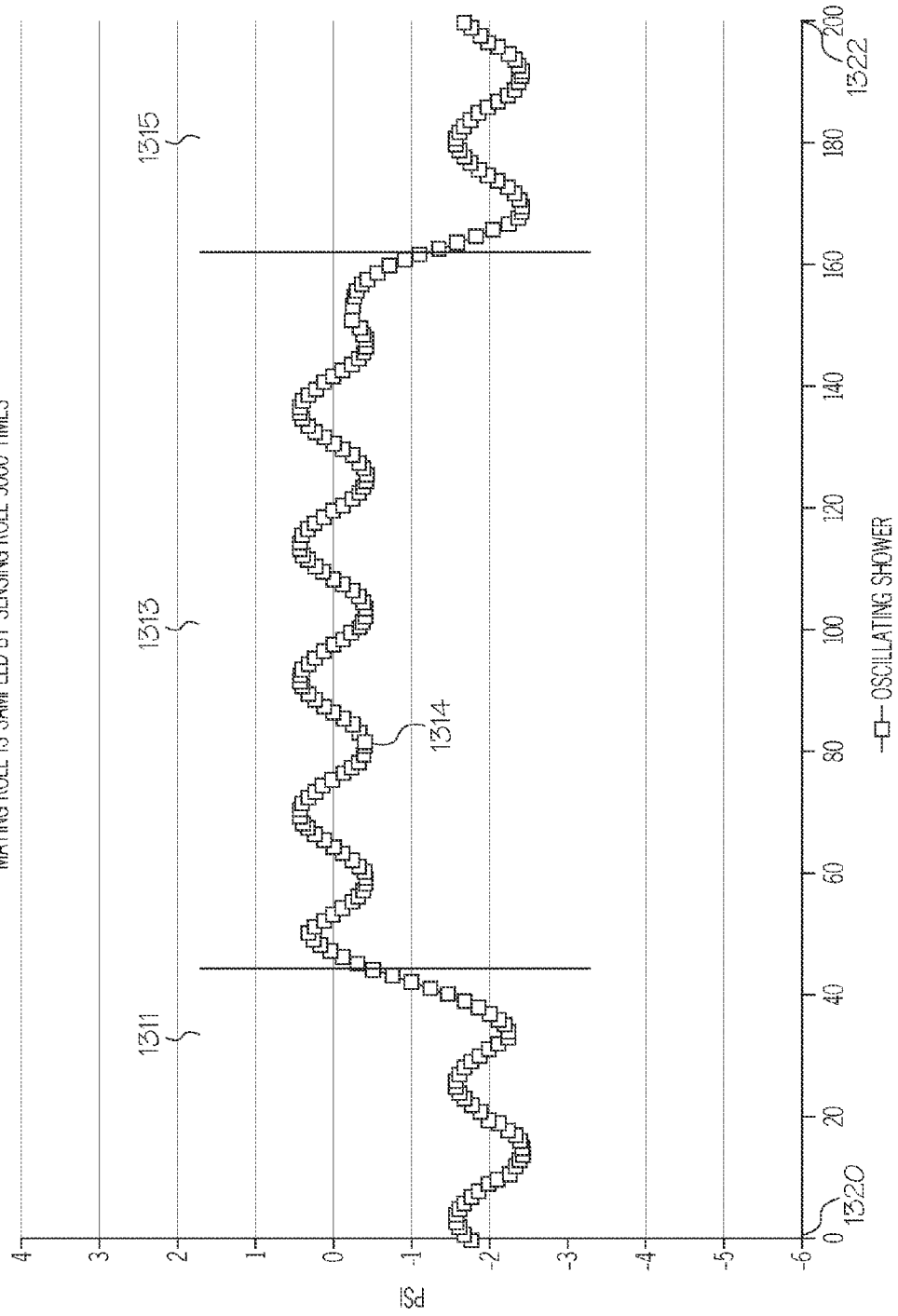

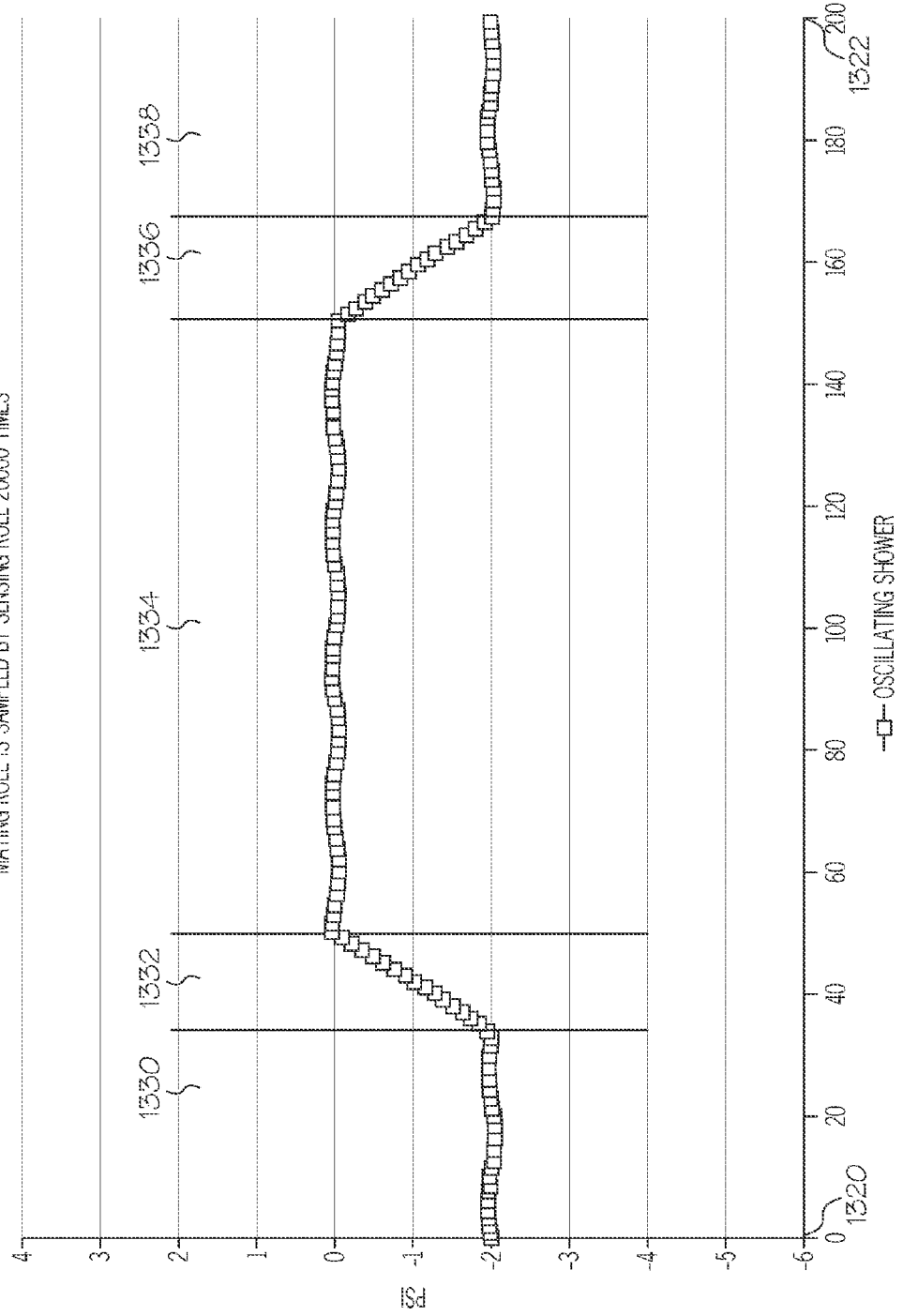

MONITORING OSCILLATING COMPONENTS

RELATED APPLICATIONS

The present application is related to U.S. patent application Ser. No. 14/735,947 entitled MONITORING MACHINE WIRES AND FELTS filed concurrently herewith, U.S. patent application Ser. No. 14/735,892 entitled COUNT-BASED MONITORING MACHINE WIRES AND FELTS filed concurrently herewith, U.S. patent application Ser. No. 14/735,716 entitled MONITORING APPLICATOR RODS filed concurrently herewith, U.S. patent application Ser. No. 14/736,060 entitled MONITORING APPLICATOR RODS AND APPLICATOR ROD NIPS filed concurrently herewith, and U.S. patent application Ser. No. 14/735,655 entitled MONITORING UPSTREAM MACHINE WIRES AND FELTS filed concurrently herewith, the disclosures of which are incorporated by reference herein in their entirety.

FIELD

The present invention relates generally to papermaking and, more particularly to monitoring one or more components in the papermaking process.

BACKGROUND

Nipped rolls are used in a vast number of continuous process industries including, for example, papermaking, steel making, plastics calendaring and printing. In the process of papermaking, many stages are required to transform headbox stock into paper. The initial stage is the deposition of the headbox stock, commonly referred to as "white water," onto a paper machine forming fabric, commonly referred to as a "wire." Upon deposition, a portion of the white water flows through the interstices of the forming fabric wire leaving a mixture of liquid and fiber thereon. This mixture, referred to in the industry as a "web," can be treated by equipment which further reduce the amount of moisture content of the finished product. The fabric wire continuously supports the fibrous web and transfers it to another fabric called a felt which advances it through the various dewatering equipment that effectively removes the desired amount of liquid from the web. Water from the web is pressed into the wet felt and then can be removed as the wet felt passes a suction box. Dry felts can also be used to support the fibrous web through steam dryers.

One of the stages of dewatering is effected by passing the web through a pair or more of rotating rolls which form a nip press or series thereof, during which liquid is expelled from the web via the pressure being applied by the rotating rolls. The rolls, in exerting force on the web and felt, will cause some liquid to be pressed from the fibrous web into the felt. The web can then be advanced to other presses or drying equipment which further reduce the amount of moisture in the web. The "nip region" is the contact region between two adjacent rolls through which the paper web passes.

The condition of the various wires and felts can cause variations in the amount of liquid and other materials that are removed from the web which can, in turn, alter an amount of nip pressure applied to the web in a nip region. Other components in the papermaking process such as size application stations, coating stations, doctor blades, and oscillating showers can also affect the characteristics of the web. Even nip pressure axially along the roll is beneficial in papermaking and contributes to moisture content, caliper, sheet strength and surface appearance. For example, a lack of uniformity in the nip pressure can often result in paper of poor quality. Thus, there remains a need to monitor various components of the papermaking process and account for their potential effect on nip pressure at one or more nip regions.

SUMMARY

In accordance with one aspect of the present invention a system associated with a sensing roll and a mating roll for collecting roll data includes the sensing roll and mating roll located relative to one another to create a nip therebetween, wherein a web of material travels through the nip from an upstream direction to a downstream direction and an oscillating component, upstream from the nip, is arranged relative to the web of material such that it periodically oscillates relative to the web of material; and a plurality of sensors located at axially spaced-apart locations of the sensing roll, wherein each sensor enters a region of the nip during each rotation of the sensing roll to generate a respective sensor signal. The system also includes structure for generating a periodically occurring starting reference associated with each oscillation of the oscillating component; and a processor to receive the periodically occurring starting reference and the respective sensor signal generated by each sensor. After receiving the respective sensor signal, the processor operates to: determine a particular one of the plurality of sensors which generated the respective sensor signal, based upon a value occurring between when the respective sensor signal was generated and a most recent starting reference, identify one of a plurality of tracking segments associated with the oscillating component, wherein each of the plurality of tracking segments is, respectively, associated with a different value, and store the respective sensor signal to associate the respective sensor signal with the identified one tracking segment.

In accordance with one aspect of the present invention the oscillating component comprises either a doctor blade or an oscillating shower. In accordance with related aspects of the invention each of the respective sensor signals comprises a pressure value.

In a related aspect of the present invention the processor receives the respective sensor signal for each of the plurality of sensors during each rotation of the sensing roll, and a plurality of the respective sensor signals occur during a plurality of rotations of the sensing roll. For each one of the plurality of the respective sensor signals, the processor identifies an associated sensing roll axial segment and the identified one tracking segment.

In yet another related aspect, the sensing roll comprises n axial segments, having respective index values: 1, 2, . . . , n; the oscillating component's period of oscillation comprises m tracking segments, having respective index values: 1, 2, . . . , m, such that there are (n times m) unique permutations that are identifiable by a two-element set comprising a respective axial segment index value and a respective tracking segment index value. A respective average pressure value can be associated with each of the (n times m) unique permutations, each of the respective average pressure values based on previously collected pressure readings related to the nip.

The one tracking segment may be identified based upon the value and a time period occurring from when a portion of the mating roll, the sensing roll or another element moves from adjacent the oscillating component to the nip.

In accordance with yet another aspect of the present invention, a method associated with a sensing roll and a mating roll for collecting roll data includes generating a respective sensor signal from each of a plurality of sensors located at axially spaced-apart locations of the sensing roll, wherein each respective sensor signal is generated when each sensor enters a region of a nip between the sensing roll and the mating roll during each rotation of the sensing roll; the sensing roll and mating roll located relative to one another to create a nip therebetween, wherein a web of material travels through the nip from an upstream direction to a downstream direction and an oscillating component, upstream from the nip, is arranged relative to the web of material such that it periodically oscillates in a direction transverse to the travel of the web of material. The method also includes generating a periodically occurring starting reference associated with each oscillation of the oscillating component; and receiving the respective sensor signal generated by each sensor. After receiving the respective sensor signal, the method continues with determining a particular one of the plurality of sensors which generated the respective sensor signal, based upon a value occurring between when the respective sensor signal was generated and a most recent starting reference, identifying one of a plurality of tracking segments associated with the oscillating component, wherein each of the plurality of tracking segments is, respectively, associated with a different value, and storing the respective sensor signal to associate the respective sensor signal with the identified one tracking segment.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements.

FIGS. 4A and 4B illustrate a table of how collecting x sensor readings from a sensor would be associated with the different circumferential segments of the mating roll, in accordance with the principles of the present invention.

FIGS. 6, 7, and 8 depict matrices of different values that can be calculated for various axial segments and circumferential segments of a mating roll in accordance with the principles of the present invention.

FIGS. 11A-11D illustrate an oscillating cleaning shower that affects nip pressures in accordance with the principles of the present invention.

DETAILED DESCRIPTION

The present application is related to each of the following: U.S. patent application Ser. No. 14/268,672 entitled METHOD AND SYSTEM ASSOCIATED WITH A SENSING ROLL AND A MATING ROLL FOR COLLECTING ROLL DATA, filed May 2, 2014; U.S. patent application Ser. No. 14/268,706 entitled METHOD AND SYSTEM ASSOCIATED WITH A SENSING ROLL AND A MATING ROLL FOR COLLECTING DATA INCLUDING FIRST AND SECOND SENSOR ARRAYS, filed May 2, 2014; and U.S. patent application Ser. No. 14/268,737 entitled METHOD AND SYSTEM ASSOCIATED WITH A SENSING ROLL INCLUDING PLURALITIES OF SENSORS AND A MATING ROLL FOR COLLECTING ROLL DATA, filed May 2, 2014, the disclosures of which are incorporated by reference herein in their entirety.

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
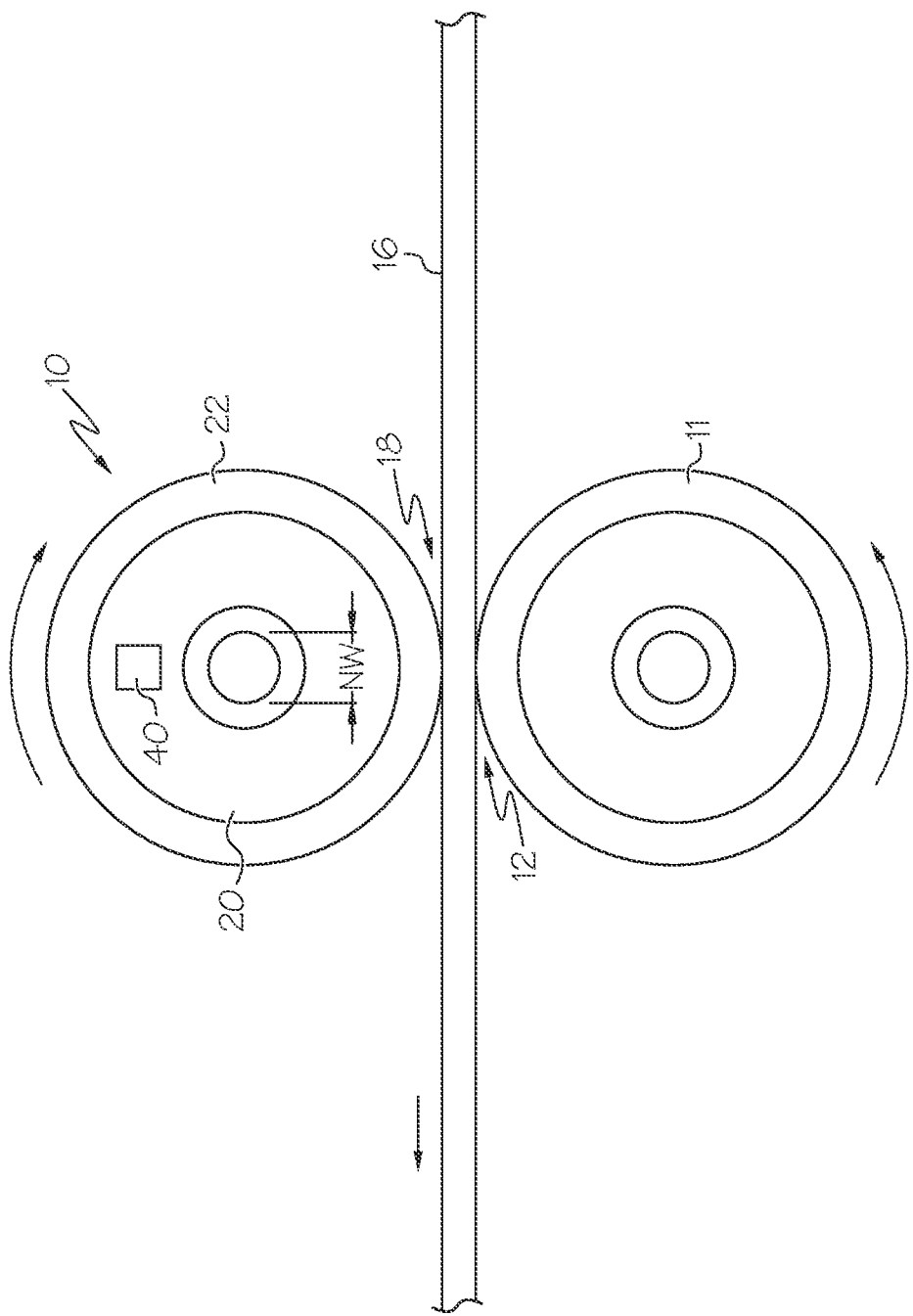
FIG. 1 is an end, schematic view of a nip press, in accordance with the principles of the present invention, showing the formation of a web nipped between the nip rolls, the nip width of the nip press being designated by the letters "NW."
Figure 2:
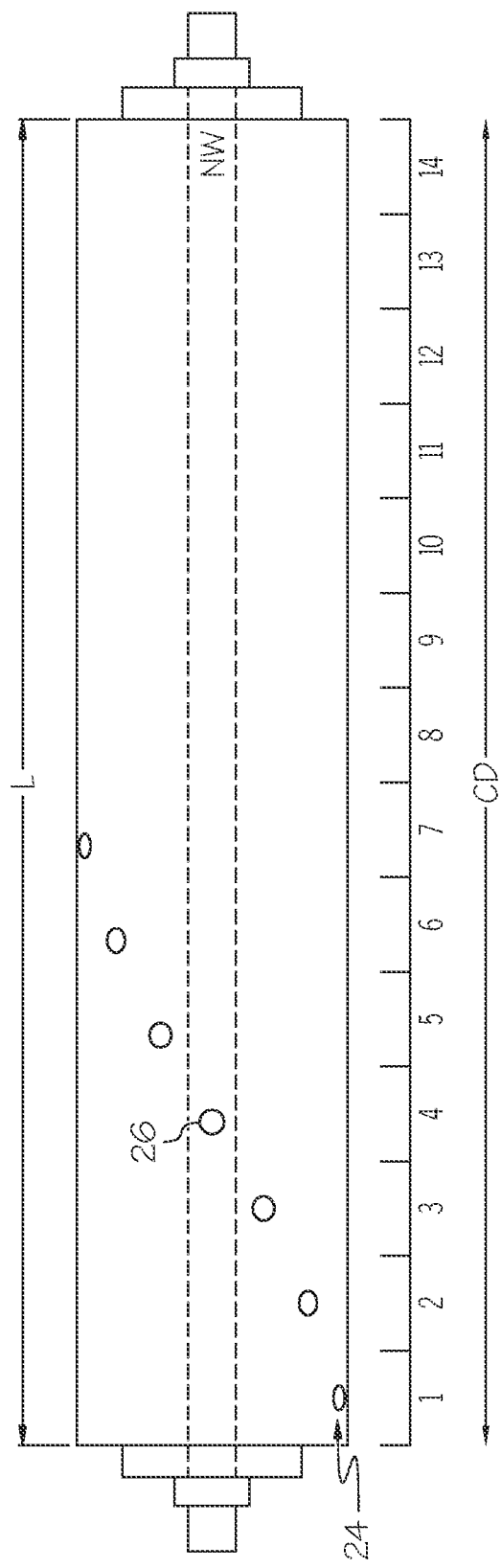
FIG. 2 is a side elevation view of a sensing roll showing the placement of a line of sensors in accordance with the principles of the present invention.

As illustrated in FIG. 1, a sensing roll 10 and a mating roll 11 define a nip 12 receiving a fibrous web 16, such as a paper web, to apply pressure to the web 16. It is contemplated that, in some cases, a continuous band felt may support the web such that the felt and the web enter the nip 12. The sensing roll 10 comprises an inner base roll 20 and an outer roll cover 22. As shown in FIG. 2, a set 24 of sensors 26 is disposed at least partially in the roll cover 22. The set 24 of sensors 26 may be disposed along a line that spirals around the entire length of the roll 10 in a single revolution to define a helical pattern, which is a common sensor geometry arrangement for roll covers. However, the helical pattern is merely an example and any arrangement is contemplated in which at least one sensor is placed at each axial position, anywhere along the circumference, at which data is to be collected. Each sensor 26 can, for example, measure the pressure that is being exerted on the sensor when it enters a region of the nip 12 between the rolls 10 and 11. In particular, the set 24 of sensors 26 may be positioned in the sensing roll 10, for example, at different axial locations or segments along the sensing roll 10, wherein the axial segments are preferably equally sized. In the illustrated embodiment, there are fourteen axial segments, labeled 1-14 in FIG. 2, each having one sensor 26 located therein. It is also contemplated that the set 24 of sensors 26 may be linearly arranged so as to define a line of sensors, i.e., all sensors reside at the same circumferential location. One of ordinary skill will readily recognize that more than fourteen, or less than fourteen, axial segments may be provided as well along with a corresponding equal number of axially-spaced sensors located on the sensing roll. Also, in the description below, each sensor 26 may be referred to as a pressure sensor, for example, but other types of sensors are also contemplated such as, for example, temperature sensors.

Because having even nip pressure is beneficial during paper manufacturing, correctly calculating and displaying the nip pressure profile are also beneficial since any corrections or adjustments to be made to the rotating rolls based on an inaccurate calculated nip pressure profile could certainly exacerbate any operational problems. There are three primary measurements of variability. The nip pressure profile has variability that can be termed cross-directional variability as it is the variability of average pressure per cross-direction position across the nip. Another type of variability represents the variability of the high speed measurements at each position in the single line of sensors. This variability represents the variability of other equipment in the paper making process such as, for example, wires and felts and also including the rotational variability of the mating roll, i.e., the roll nipped to the sensing roll, and the oscillating variability of, for example, a doctor blade or cleaning shower. The third variability in the nip profile includes the variability of multiple sensors, discussed below, at each cross-directional position of the roll. This variability represents the "rotational variability" of the sensing roll as it rotates through its plurality of sensing positions and can only be seen by having a plurality of sensors in the same position.

One benefit of embedding a single set of sensors in covered rolls is to measure the real-time pressure profile and adjust loading pressures and roll crowns or roll curvature (using, for example, internal hydraulic cylinders) to achieve a flat pressure profile. As an alternative to a single set of sensors, two pluralities or arrays of sensors can be included on a sensing roll as described more fully in the earlier referenced U.S. patent application Ser. No. 14/268,672 which is incorporated herein by reference in its entirety. The sensing roll can, for example, be separated into 14 axial segments. First and second pluralities of sensors, respectfully, are disposed at least partially in the roll cover. Each of the first plurality of sensors is located in one of the 14 axial segments of the sensing roll. Likewise, each of the second plurality of sensors is located in one of the 14 axial segments of the sensing roll. Each sensor of the first plurality has a corresponding sensor from the second plurality located in a same axial segment of the sensing roll. The first plurality of sensors can be disposed along a line that spirals around the entire length of the roll in a single revolution to define a helical pattern. In a similar manner, the second plurality of sensors can be disposed along a line that spirals around the entire length of the roll in a single revolution to define a helical pattern. The first and second pluralities of sensors can be separated from one another by 180 degrees. Each sensor measures the pressure that is being exerted on the sensor when it enters a region of a nip. It is contemplated that the first and second pluralities of sensors may be linearly arranged so as to define first and second lines of sensors, which are spaced approximately 180 degrees apart. Various alternative configurations of a plurality of sensors are also contemplated. For example, a plurality of sensors could be helically arranged in a line that spirals, in two revolutions, around the entire length of roll.

Typically, the sensing roll 10 and the mating roll 11 are sized differently, i.e., they have a different size radially and circumferentially. Each roll may have variations in its size circumferentially across the axial dimension. Further, as the roll rotates, the distance from the central axis (radial dimension) to the outer surface may vary for each axial position at the same angle of rotation even were the circumferential dimensions to be the same for each axial position.

For example, rolls are periodically ground which results is small arbitrary changes in diameter from the manufacture's specification. There may also be slippage with one or more of the rolls resulting in the sensing roll surface traveling at a speed that is different than the mating roll surface. Consequently, it is rare that two rolls would have exactly the same period of rotation or have periods that are exact harmonics.

Thus, as the sensing roll 10 and mating roll 11 travel through multiple rotations relative to one another, a particular sensor 26 may not always enter the region of the nip 12 with the same circumferential portion of the mating roll 11 as it did in a previous rotation. This behavior can be utilized to create data maps corresponding to the surface of the mating roll 11. Different average pressure matrices, each collected and built during different periods of time can be compared with one another to investigate how they vary from one another. Variability between the different data maps can indicate possible problems with the mating roll 11, such as roll surface irregularities, bearing wear, and roll flexing. Variability analysis of the sensor data may also indicate possible problems with upstream or downstream processing equipment, e.g., upstream rolls, an upstream forming wire, an upstream felt or downstream rolls.

The sensing and mating rolls 10 and 11 may be each separated into 14 axial segments. All of the axial segments on the sensing roll 10 may or may not be of the same length, and all of the axial segments on the mating roll 11 also may or may not be of the same length. In the illustrated embodiment, it is presumed that all of the axial segments on the sensing roll 10 are of the same length and all of the axial segments on the mating roll 11 are of the same length. The axial segments on the sensing roll 10 may be aligned with the axial segments on the mating roll 11. Furthermore, the mating roll 11 may be separated into individual circumferential segments such as, for example, 22 circumferential segments, all of substantially the same dimension.

Figure 3:
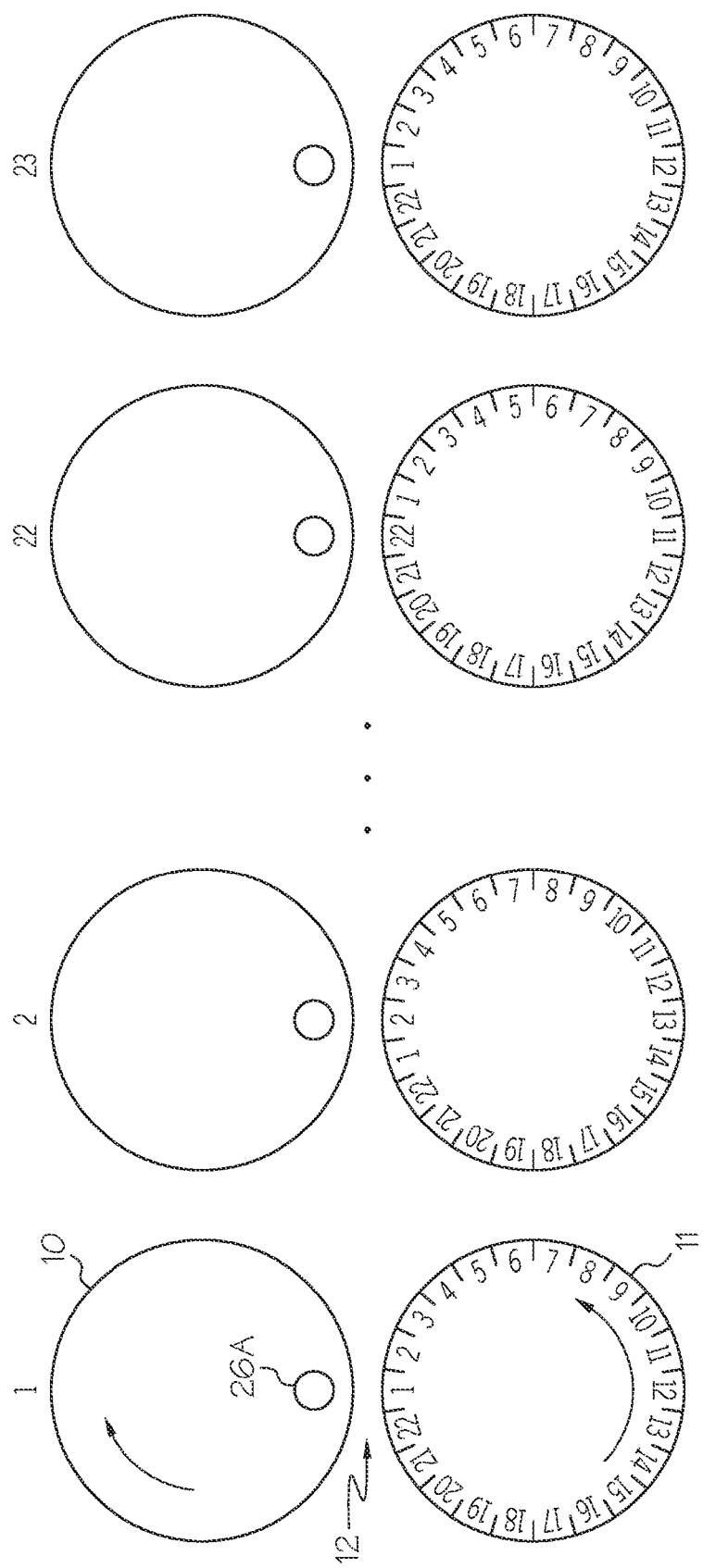
FIG. 3 illustrates how a rotation of the sensing roll and the mating roll can change a circumferential segment of the mating roll that enters a nip region coincidentally with a sensor on each rotation of the sensing roll, in accordance with the principles of the present invention.

FIG. 3 illustrates how rotation of the sensing roll 10 and the mating roll 11 can change a circumferential segment of the mating roll 11 that enters a nip region coincidentally with a sensor on each rotation of the sensing roll 10. FIG. 3 is presented as series of position snapshots from 1 to 23 of the rotating sensing roll 10 which also correspond to 22 rotations of the sensing roll 10 and 23 rotations of the mating roll 11. The left-most portion of FIG. 3 shows a starting position (i.e., where a first sensor reading is collected) and the right-most portion represents a position of the two rolls 10 and 11 after 22 rotations of the sensing roll 10 after the first sensor reading was collected. At the starting position, circumferential segment #1 of the mating roll 11 is positioned in the region of the nip 12 along with the sensor 26A. The mating roll 11, in this example, is rotating slightly faster than the sensing roll 10 such that at a second position snapshot following a complete rotation from the starting position, the sensor 26A is once again positioned in the region of the nip 12 but the mating roll 11 has rotated so that circumferential segment #2 is in the region of the nip 12. The values of FIG. 3 are selected just as examples to illustrate with concrete numbers operating principles of the present invention. In accordance with the example values of FIG. 3, when the sensing roll had completed 22 rotations, the mating roll 11 has completed 23 rotations. Thus, after 21 rotations from the starting position (indicated by position #22 in FIG. 3), the sensor 26A of the sensing roll 10 has been able to collect 22 sensor readings, presuming it collected a reading at the starting position, and has "seen" all portions of the circumference of the mating roll 11. Therefore, 22 circumferential segments can be selected as an example number of circumferential segments. One of ordinary skill will recognize that the mating roll 11 could be broken into more circumferential segments but that it would take more than 22 rotations of the sensing roll 10 to collect data from sensor 26A that corresponds to each of the different circumferential segments.

It would be rare that the period of the mating roll would be an integer ratio of the period of the sensing roll. Hence it is very unlikely that a stationary pattern would be maintained between these rolls and this would tend to even out the sampling of tracking segments, discussed below.

Because the one sensor 26A enters the region of the nip 12 concurrently with different circumferential segments of the mating roll 11 in the illustrated embodiment, the nip pressure measured by the one sensor 26A may vary during sequential roll rotations due to the change in pressure caused by the mating roll 11. Aspects of the present invention contemplates mapping readings, or signals, from each sensor 26 of the set 24 over time to see how the pressure readings, or signals, vary for each sensor due to each sensor entering the region of the nip 12 concurrently with different circumferential segments of the mating roll 11. As noted above, the mapped data may be used to determine possible problems with the mating roll 11 and, as more fully described below, data collection can be performed involving possible problems related to upstream or downstream processing equipment other than the sensing roll 10 and the mating roll 11.

Hence, the present invention contemplates using sensors 26 to measure for rotational variability that is generated by the high speed rotation of the mating roll 11 when pressure signals, or readings, from the sensors 26 are time synchronized to the mating roll position. In order to measure for rotational variability, the mating roll 11 must have some impact on the pressure in the nip 12 to be measured. The dominant impact on the sensed nip pressure will likely be that of the mating roll 11 which directly presses against the sensing roll 10. However, it may be possible to synchronize sensor measurements with upstream rolls (not shown) which form another nip and impact the water content and thickness of the web which affect the nip pressure seen by the sensing roll 10. Furthermore, as rolls (not shown) in a downstream nip may pull the web and cause changes in web tension, it may be possible to also synchronize sensor measurements with these rolls. The sensing and mating rolls 10 and 11 will be used to illustrate the principles of this invention; however all principles are applicable to upstream and downstream processing equipment, such as upstream and downstream rolls, an upstream forming wire or an upstream felt.

Figure 4A:
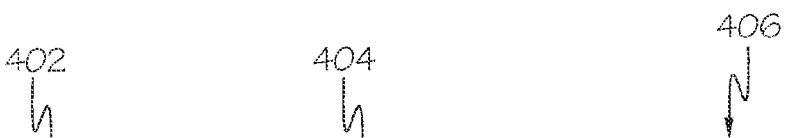

Continuing the example of FIG. 3, the mating roll 11 may have rotational characteristics that generate, for example, a sinusoidal pressure pattern which is 8 pounds per square inch (psi) peak-to-peak. In the illustrated example of FIGS. 4A and 4B, to start, the pressure pattern is "0" when circumferential segment #1 of the mating roll 11 is in the region of the nip 12. FIGS. 4A and 4B are a table of how collecting 51 sensor readings from sensor 26A would be associated with the different circumferential segments of the mating roll 11. The left column 402 is the sequential number assigned to the sensor reading and the middle column 404 represents a pressure reading value from sensor 26A according to the sinusoidal pattern described above and right column 406 is the circumferential segment of the mating roll 11 in the region of the nip when a corresponding pressuring reading is taken from the sensor 26A. Each pressure reading value is time-synchronized with the period of rotation of the mating roll 11 by associating that value with one of the circumferential segments of the mating roll 11 that was in the region of the nip 12 when the pressure reading was sensed.

One convenient way to characterize the difference in periodicity is using units-of-measure that measure that difference in terms of time segments, e.g., 22 time segments in the illustrated embodiment. The length of each time segment is the mating roll period divided by the number of predefined time segments. As discussed below, the predefined number of time segments may correspond to a predefined number of mating roll circumferential segments. A period of the sensing roll 10 can be described as being x time segments smaller/larger than a period of the mating roll 11. For example, according to FIG. 3, the sensing roll 10 may have a period that is 1.0 mating roll time segment more than the period of the mating roll 11 (equivalently, the mating roll 11 can have a period that is 1.0 mating roll time segment smaller than the period of the sensing roll). In such an example, as the sensing roll 10 makes one complete revolution, the mating roll 11 will make more than a complete revolution by an amount equal to 1.0 mating roll time segment due to it having a smaller period than the sensing roll 10.

As noted above, the 22 time segments of the mating roll period can correspond to 22 circumferential segments around the mating roll 11. Thus, even though, at a conceptual level, it is the period of the mating roll 11 that is being separated into a plurality of time segments, that concept can correspond to a physical circumference of the mating roll 11, wherein each individual time segment of the mating roll period also corresponds to a circumferential segment around the mating roll 11. Accordingly, differences in rotational periods between the sensing roll 10 and the mating roll 11 measured in units of "time segments" can just as easily be considered in units of "circumferential segments." In the description of at least some embodiments of the present invention below, reference to "circumferential segments" is provided as an aid in understanding aspects of an example embodiment of the present invention. However, one of ordinary skill will recognize that "time segments" and mating roll periodicity could be utilized as well without departing from the scope of the present invention. The "circumferential segments" and "time segments" can also be referred to generically as "tracking segments"; this latter term encompassing both types of segments associated with the mating roll 11 and other periodic components as described below.

As mentioned above, data similar to that of FIGS. 4A and 4B is captured for each sensor 26 of the set 24. Thus, as each sensor 26 arrives at the region of the nip 12 and senses a pressure reading, a particular mating roll outer surface portion at an axial location corresponding to that sensor and at one of the 22 circumferential segments of the mating roll 11 will also be in the nip 12. Determining the mating roll segment that is in the nip 12 can be accomplished in a variety of different ways. One way involves indexing a particular one of the 22 mating roll segments with a trigger signal that is fired each time the mating roll 11 completes one revolution; a time period since the last trigger signal can be used to determine which of the 22 segments (measured relative to the indexed segment) is in the nip 12. For example, if the time between each firing of the trigger signal is 220 ms, then each time segment is 10.0 ms, which corresponds to one of the 22 mating roll circumferential segments. A pressure signal generated by a sensor 26 in the nip region occurring at 30 ms after the trigger signal would be assigned to time segment 3 as three 10.0 ms segments will have passed, e.g., the nip region, from when the trigger signal is made to when the pressure signal is generated.

Figure 5:
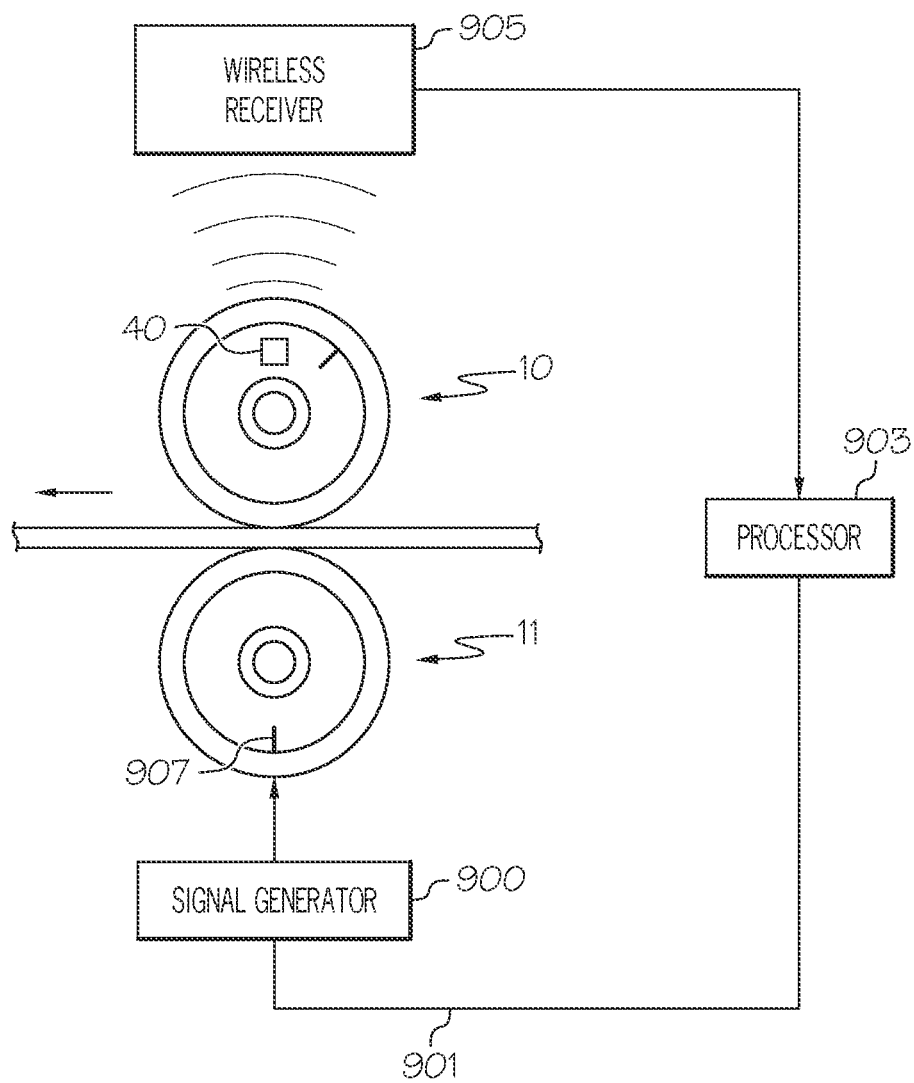
FIG. 5 is a schematic drawing showing the basic architecture of a particular monitoring system and paper processing line in accordance with the principles of the present invention.

In FIG. 5, a processor 903 can be present that can generate a real-time nip profile. In addition, the processor 903 can also receive a trigger signal 901 related to the rotation of the mating roll 11. As just described, some circumferential segment or position 907 of the mating roll 11 can be indexed or encoded such that a signal generator 900 detects the encoded segment 907 and generates the trigger signal 901 each time the signal generator 900 determines that the segment 907 of the mating roll 11 completes another full rotation. When the mating roll 11 is rotated such that the circumferential position or segment 907 is aligned with a detector portion of the signal generator 900, then the one of the 22 circumferential segments that happens to be positioned in the nip region can arbitrarily be labeled as the first circumferential segment such that the other circumferential segments can be numbered relative to this first segment. This particular rotational position of the mating roll 11 can be considered a reference position. As the mating roll 11 rotates, its rotational position will vary relative to that reference position and the amount of this variance determines which of the 22 circumferential segments will be positioned in the nip region. Accordingly, based on the rotational position of the mating roll 11 relative to that reference position a determination can be made as to which of the 22 circumferential segments is in the nip region when a particular sensor 26 generates a pressure signal. FIG. 5 illustrates the overall architecture of one particular system for monitoring paper production product quality. The system of FIG. 5 includes the processor 903, noted above, which defines a measurement and control system that evaluates and analyzes operation of the roll 11. The processor 903 comprises any device which receives input data, processes that data through computer instructions, and generates output data. Such a processor can be a hand-held device, laptop or notebook computer, desktop computer, microcomputer, digital signal processor (DSP), mainframe, server, other programmable computer devices, or any combination thereof. The processor 903 may also be implemented using programmable logic devices such as field programmable gate arrays (FPGAs) or, alternatively, realized as application specific integrated circuits (ASICs) or similar devices. The processor 903 may calculate and display the real-time average pressure profile calculated at the end of the prior collection session. For example, the pressure measurements from the sensors 26 can be sent to a wireless receiver 905 from transmitter(s) 40 located on the sensing roll 10. The signals can then be communicated to the processor 903. It is contemplated that the processor 903, in addition to calculating a real-time average pressure profile, may use the real-time average pressure profile to automatically adjust crown and loading mechanisms to achieve a flat pressure profile. Crown and loading mechanisms may also be adjusted manually by an operator using information provided by the real-time average pressure profile.

There are other ways to determine the position of the mating roll 11. One way is to use a high precision tachometer that divides the rotation of the roll 11 into a number of divisions, perhaps 440. In this example, each time segment would be 20 positions on the high precision tachometer. All methods of determining the position of the mating roll are included in this invention.

In an example environment in which there are 14 axially arranged sensors 26, each of which can be uniquely referred to using an axial segment index value that ranges from "1" to "14", and there are 22 circumferential segments on the mating roll 11 (or time segments), each of which can be uniquely referred to using a tracking segment index value ranging from "1" to "22", there are 308 (i.e., 22×14=308) unique permutations of pairs consisting of a sensor number and a circumferential segment number (or time segment number), wherein each permutation is identifiable by a two-element set comprising a respective axial segment index value and a respective tracking segment index value. In the illustrated embodiment, the sensor numbers also correspond to the mating roll axial segments. Therefore the data collected can be considered a 22×14 matrix as depicted in FIG. 6. Each row of FIG. 6 represents one of the 22 mating roll circumferential segments (or time segments) and each column represents one of the 14 axially arranged sensors 26 and, thus, each cell represents one of the possible 308 permutations. Each column also corresponds to a mating roll outer surface portion at an axial location aligned with and corresponding to the sensor 26 assigned that column. Each cell represents a combination of a sensor number (or axial segment number) and a particular mating roll circumferential segment (or time segment). For example, cell 100 represents a value that will relate to a pressure reading that occurred when sensor number 14 (number 14 of the 1-14 sensors defining the set 24) entered the region of the nip 12 concurrently with a mating roll outer surface portion at an axial location corresponding to sensor number 14 and mating roll circumferential segment number 1 (or time segment number 1). Thus, each cell of the matrix represents a unique permutation from among all the possible permutations of different axial segment numbers (e.g., 1-14) and circumferential segment numbers (e.g., 1-22) (or time segments 1-22). A value stored in a particular matrix element is thereby associated with one particular permutation of possible axial segment numbers and circumferential segment numbers (or time segments).

The matrix of FIG. 6 can, for example, be a "counts" matrix wherein each cell represents the number of times a particular sensor and a particular mating roll outer surface portion at an axial location corresponding to that sensor and a particular mating roll circumferential segment were concurrently in the region of the nip 12 to acquire a pressure reading value. FIG. 7 illustrates a similarly sized matrix (i.e., 22×14) but the values within the matrix cells are different from those of FIG. 6. The cell 200 still represents a value that is related to sensor number 14 (or axial segment 14, out of 1-14 axial segments, of the mating roll 11) and circumferential segment 1 but, in this example, the value is a cumulative total of pressure readings, e.g., in pounds/inch, acquired by the sensor for that circumferential segment during a plurality of rotations of the sensing roll 10. Thus, each time sensor number 14 happens to enter the region of the nip 12 along with the mating roll circumferential segment number 1, the acquired pressure reading value is summed with the contents already in the cell 200. Each of the 308 cells in this matrix of FIG. 7 is calculated in an analogous manner for their respective, associated sensors and segments.

Figure 8:
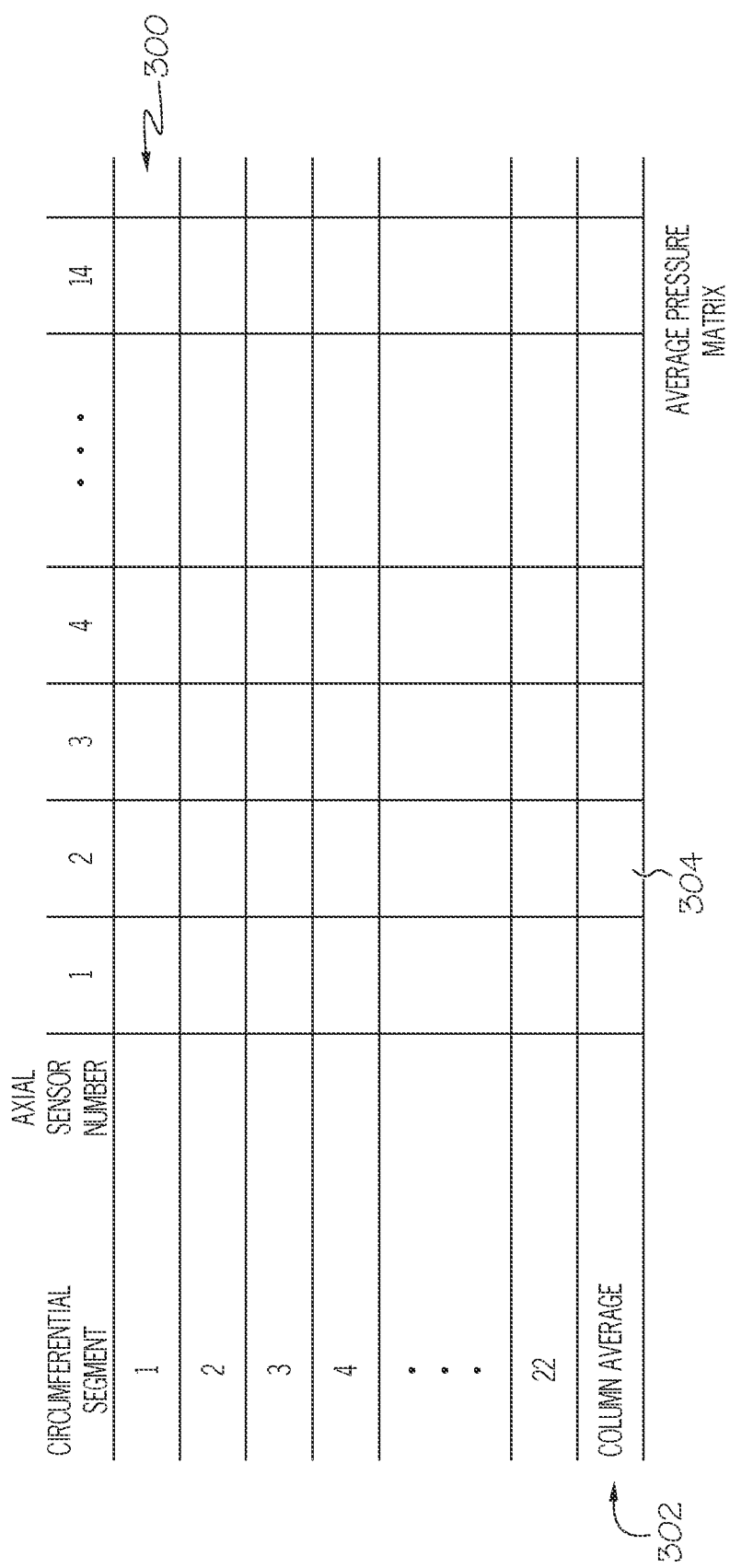

From the matrices of FIG. 6 and FIG. 7, an average pressure matrix depicted in FIG. 8 can be calculated. For example, cell 100 includes the number of pressure readings associated with sensor number 14 (or axial segment 14 of the mating roll 11) and circumferential segment number 1 while cell 200 includes the total or summation of all those pressure readings. Thus, dividing cell 200 by cell 100 provides an average pressure value for that particular permutation of sensor number and mating roll circumferential segment number which entered the region of the nip 12 concurrently.

Other matrices, not shown, can be calculated based on the sensor data used to build the matrices of FIGS. 6, 7, and 8. For example, squaring the pressure values used to build the matrix of FIG. 7, and then summing those squared values can be done to build a sum-squared matrix which can be useful in partitioning of variability into cross-directional (CD) variability, rotational variability, 2-dimensional variability, and residual variability. The variability partitions can be trended for operational and/or maintenance purposes.

As a result, the matrix of FIG. 8 represents an average pressure value that is sensed for each particular sensor number and mating roll circumferential segment number. The length of time such data is collected determines how many different pressure readings are used in such calculations.

The raw pressure readings, or pressure signals, from the sensors 26 can be affected by a variety of components in the system that move the web of material. In particular, the average values in the average pressure matrix of FIG. 8 are related to variability synchronized to the mating roll 11. However, there may be other variability components that are not synchronized with the mating roll 11 such as variability in a cross direction (CD), shown in FIG. 2. One measure of this CD variability is captured by calculating an average for each column of the average pressure matrix. Thus, the average pressure matrix of FIG. 8 can also include a row 302 that represents a column average value. Each of the 14 columns may have 22 cells that can be averaged together to calculate an average value for that column. For example, cell 304 would be the average value in the 22 cells of the second column of the average pressure matrix.

Individual collection sessions of pressure readings to fill the matrices of FIGS. 6, 7, and 8 may be too short to build robust and complete matrices due to data buffer and battery life limitations of data acquisition systems in communication with the sensing roll 10. In such cases, consecutive collection sessions can be combined by not zeroing the matrices (i.e., counts and summation matrices) upon starting a new collection session or combining the separate matrices collected in a post hoc fashion. Consequently, collections may be stopped and restarted without loss of data fidelity as long as the synchronization of the mating roll is maintained. In particular, combining multiple collection sessions that are separated by gaps in time can be beneficial to help populate the matrices. For example, if the period difference between the two rolls were closer to 2.001 instead of 1.0 time or circumferential segments, the collection would have a tendency to collect only evenly numbered time/circumferential segments in the short term (i.e., evenly numbered segments are those that are offset an even number of segments from a starting segment) until sufficient time has passed to move the collection into the odd numbered time/circumferential segments. Combining collection sessions separated by a long time delay may help to shift the collection so that data is more uniformly captured for all the different time/circumferential segments because there is no expectation that the period of the mating roll will be related to arbitrary time gaps between collection sessions.

Figure 9:
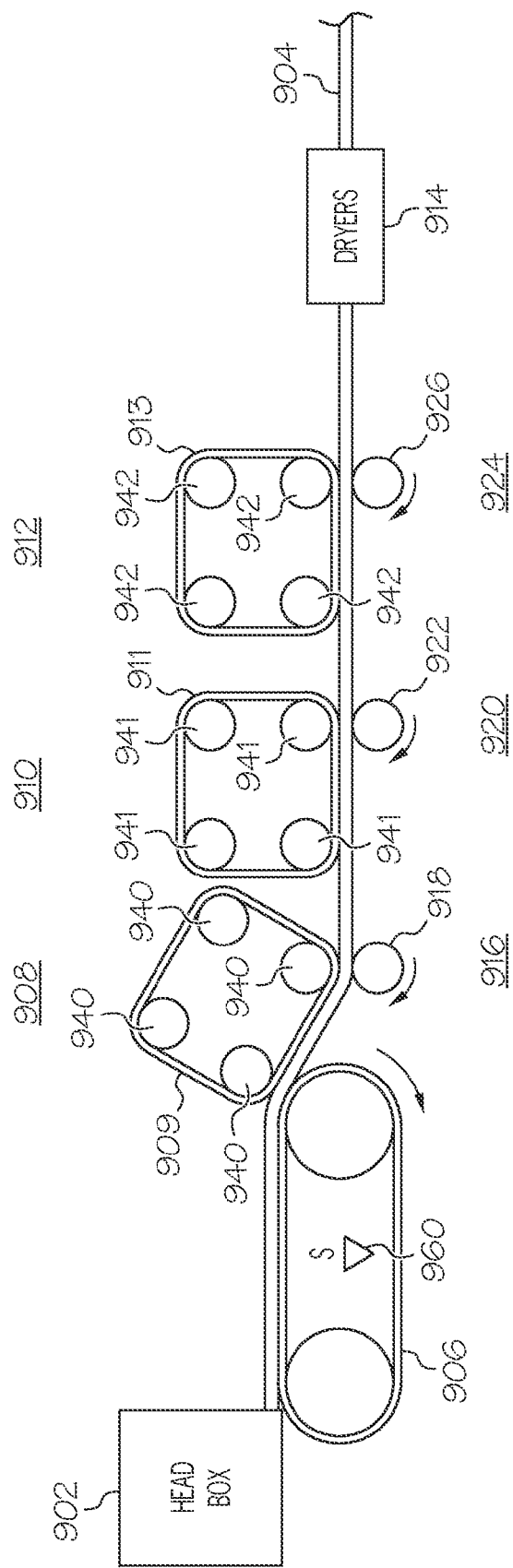
FIG. 9 illustrates an exemplary process configuration in accordance with the principles of the present invention in which each of the various circles represents a rotating component (e.g. a roll) that help propels a web of material 904 through the process.

The press of FIG. 1 can be located at a number of different positions within the chain or serial sequence of different components that are part of a modern paper processing operation. FIG. 9 illustrates an exemplary process and system configuration in accordance with the principles of the present invention in which each of the various circles represents a rotating component (e.g. a roll) that helps propel a web of material 904 through the process/system. The process starts at a headbox 902 where a fiber slurry is distributed over a wire mesh 906 which allows liquid to readily drain from the slurry. From the wire mesh 906, the web of material 904 travels to a first wet felt station 908 that helps dry the web of material 904. A felt 909 at the first station 908 is a continuous band arranged to travel in a loop pattern around a plurality of rolls 940. In the example of FIG. 9, there are four rolls 940. The felt 909 enters a press area 916 between one of the rolls 940 and a sensing roll 918 with the web of material 904. The sensing roll 918 may operate similar to the sensing roll 10 of FIG. 1. Downstream from the wet felt station 908 is another wet felt station 910 having its own felt 911 traveling in a loop pattern around another set of four rolls 941. There is also a second press region 920 having a press roll 922, which, in the illustrated embodiment, is not a sensing roll. The last wet felt station 912 has a felt 913 traveling in a loop pattern around another set of four rolls 942. The felt 913 together with the web of material 904 is pressed by one of the rolls 942 and a second sensing roll 926 in a third press region 924. The felts 909, 911, 913 are pressed into the web of material in their respective press regions 916, 920, 924 to absorb liquid from the web of material 904. In this manner, the web of material 904 is drier after passing through the wet felt stations 908, 910, 912. By "drier" it is meant that the fibers in the web of material 904 have a higher percentage by weight of fibers after the wet felt stations than before. Additional drying can be performed, however, by separate dryers 914 before the web of material 904 progresses further downstream in the process of FIG. 9. The various felts and rolls of FIG. 9, and the spacing between the different stations are not shown to scale but are provided to simplify description of various aspects of different embodiments of the present invention. For example, the web of material 904 does not travel unsupported for long distances. Typically, the web of material 904 will be removed from one felt and be transferred by a next-downstream felt. In additional, the web of material can be supported by other supporting rolls and by tension between various rolls.

A felt (e.g., 909) can have variations in its material that cause different effects on the web of material 904. For example, seams, worn spots, or even holes, may not be as effective at removing liquid from the web of material 904 as portions of the felt 909 that are in good condition. Thus, some regions of the web of material 904 may have more or less water relative to other regions of the web of material 904 due to variations in the felt 909, i.e., a worn portion of the felt 909 may not remove as much moisture from a region of the web of material that it engages as compared to a portion of the felt that is in good condition and engages another region of the web material. When a wetter region of the web of material travels through a nip in one of the press regions (e.g. 916), a pressure sensed by a sensor on a sensing roll (e.g., 918) may be greater than when a drier region of the web material 904 passes through the nip. Also, the felts 909, 911, 913 may be porous in construction and, thus, some portions of a felt may become clogged with debris, fibers, or other contaminants. When a clogged portion of a felt is pressed into, or otherwise interacts with, and affects a region of the web of material 904, not as much moisture will be removed from that region of the web of material as compared with other regions of the web of material 904 that were pressed into portions of the felt that were not clogged, or not as clogged. When that region of the web material that did not have as much moisture removed travels through a nip in one of the press regions (e.g. 916), a pressure sensed by a sensor on a sensing roll (e.g., 918) may be greater than when the other regions that experienced more moisture being removed pass through the nip. Further, when a clogged portion of a felt travels through a nip in one of the press regions (e.g. 916), a pressure sensed by a sensor on a sensing roll (e.g., 918) may be greater than when a non-clogged portion of that felt passes through the nip. Thus, a pressure reading sensed in a nip can reveal effects that a felt had on the web of material 904 upstream of that nip in addition to revealing effects from a felt passing through the nip.

The description of various components in a papermaking process with respect to FIGS. 1-9 provides an explanation of how a sensing roll can have a plurality of sensors spaced-apart in an axial direction that can sense conditions (e.g., pressure) occurring at various positions along an outside surface of the sensing roll as it rotates. In some particular instances, these values can be sensed at different axial regions of a nip that the sensing roll forms with other components such as, for example, a mating roll. Furthermore, these sensed values can be collected and arranged in a manner that is synchronized with a rotation of a rotating component (e.g., a mating roll) in order to analyze a potential effect that the rotating component may have on the papermaking process.

In addition to rotating components such as the mating roll, a felt, or a wire mesh, there can also be components in the papermaking process that oscillate in the cross-direction. In other words, such a component has a period of oscillation but the direction of oscillation is transverse, e.g., in and out of the plane of paper in FIG. 9, to the direction that the web of material 904 is traveling. This type of oscillating component has a period of oscillation such that it repeatedly travels between two extreme, or terminal, positions in a regular manner and, accordingly, the travel of the oscillating component can be segmented into tracking segments that are either segments corresponding to different times, equally defined time segments, within the period of oscillation or segments corresponding to different physical locations between the two extreme positions.

As explained in more detail below, data from a sensing roll can be collected and synchronized with an oscillating component and associated with different tracking segments related to the oscillating component. Thus, matrices similar to the counts, sums and averages matrices of FIGS. 6-8 can be constructed with respect to the oscillating component in a manner analogous to how these matrices were constructed for the rotating mating roll.

Figure 10A:
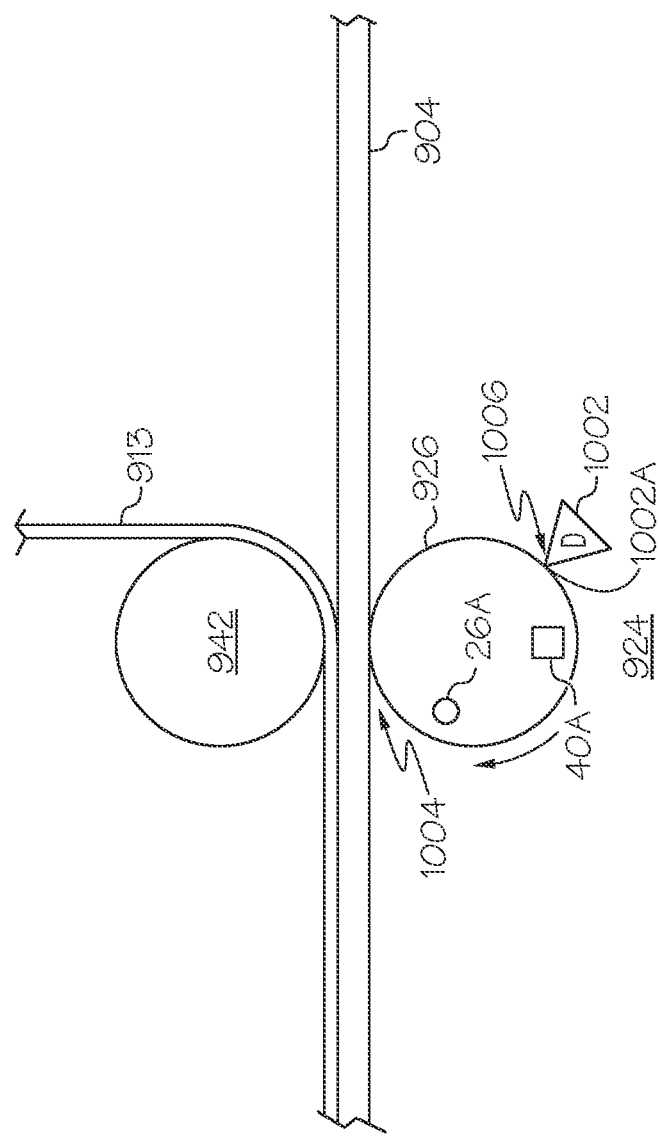
FIGS. 10A-10C illustrate an oscillating doctor blade that affects sensed nip pressures in accordance with the principles of the present invention.

FIG. 10A illustrates the press region 924 having the sensing roll 926 and a mating roll 942 that create a nip 1004 through which the felt 913 and the web of material 904 can travel. Also, each of a plurality of axially spaced-apart pressure sensors 26A, at a corresponding axial section of the sensing roll 926, passes through a region of the nip 1004 once each rotation of the sensing roll 926. There is also a doctor blade 1002 that forms a nip 1006 with the sensing roll 926 as well. The doctor blade 1002 may be constructed from a relatively hard material such as an elastomer, polyurethane, metal, or similar material. In FIG. 10A, the doctor blade 1002 extends into the plane of the drawing along an axial direction of the sensing roll 926 and a holder (not shown) holds the doctor blade 1002 in place against the surface of the sensing roll 926 to form the nip 1006. The doctor blade 1002 may have a length in an axial direction that is substantially the same as the size of the roll which it is associated with and such rolls, for example, can have a length of between about 30 inches and 400 inches. Typically, though, the length of the doctor blade 1002 may be less than the length of the associated roll by an amount that may depend on an amount of cross-direction (CD) travel of the doctor blade 1002 while it oscillates. To help the doctor blade 1002 wear more evenly, the holder (not shown) can also oscillate the position of the doctor blade 1002 in a cross or axial direction.

Figure 10B:
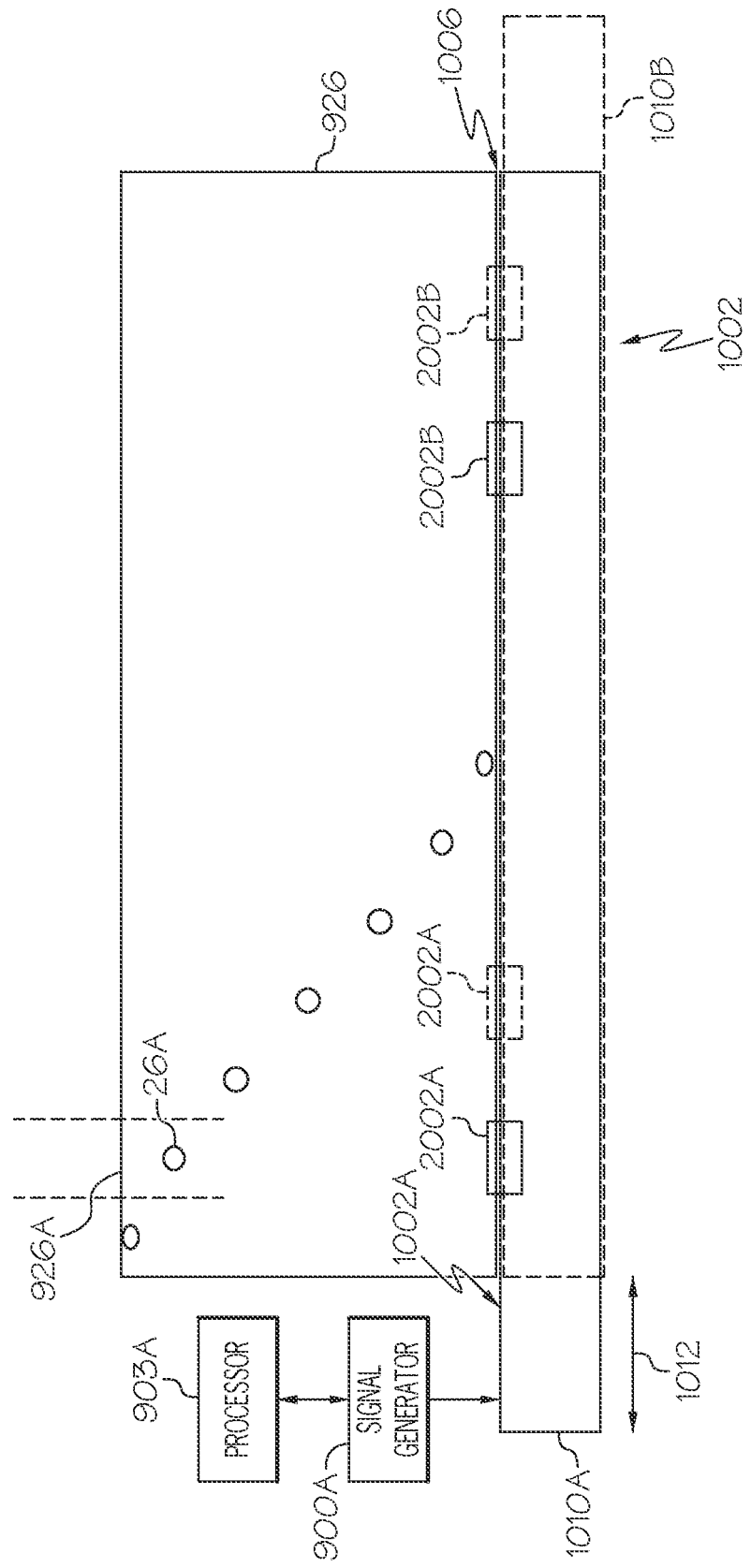

FIG. 10B is a view looking at the nip 1006 that shows how the doctor blade 1002 oscillates in the cross direction between two extreme first and second positions 1010A, 1010B. The amount of travel 1012 between the two positions 1010A, 1010B may be on the order of 1 to 10 inches. As for a period of oscillation, the time it take for the doctor blade 1002 to travel between the two extreme positions 1010A, 1010B may be 15 or 75 times as long as the period of rotation of the sensing roll 926. For example, the period of rotation of the sensing roll 926 may be between about 0.2 seconds and 1 second and the period of oscillation for the doctor blade 1002 from a home position, for example, the first position 1010A, to the second position 1010B and back to the first or home position may be about 10 seconds to about 20 seconds.

Each time when the doctor blade 1002 is positioned (e.g., in position 1010A) such that it is adjacent a signal generator 900A, the signal generator 900A produces a starting reference signal that is communicated to a processor 903A. Accordingly, upon each complete oscillation of the doctor blade 1002, a new starting reference signal will be generated. Also, a wireless transceiver 40A can be included on the sensing roll 926 to communicate sensor reading information to the processor 903A. A location of the doctor blade 1002 or, equivalently, an amount the doctor blade 1002 has traveled from a reference point, when a sensor reading is captured depends on an amount of time that has elapsed between when the sensor reading is captured and the most recently generated starting reference signal. Thus, the oscillation of the doctor blade 1002 can be segmented into a plurality of tracking segments that each can be represented by a) a different fragment or segment of the period of oscillation of the doctor blade 1002 or b) a different physical location of the doctor blade 1002, e.g., a defined point on the blade 1002, between the two extreme positions 1010A, 1010B.

Another alternative technique for determining where the doctor blade 1002 is positioned in a particular oscillation could utilize an image capturing device (e.g., a camera) and an image analyzer (e.g., software, hardware, or a combination of both). The image capturing device could be positioned so as to have a field of view that includes an edge or other point of the doctor blade 1002 over its entire amount of oscillating travel. Alternatively, an optically-detectable mark could be incorporated with the doctor blade 1002 and the image capturing device's field of view would include that optically-detectable mark over its entire range of oscillating travel. The image capturing device would capture a series of images of the doctor blade 1002 and an image analysis process could then analyze an image to determine at which tracking segment the doctor blade 1002 is located based on a position of the edge, point or the optically-detectable mark within an image frame. By comparison of a position of the doctor blade 1002 in a current image frame with its position in a previous image frame, the image analysis process could determine which direction the doctor blade 1002 is traveling, as well. This is beneficial because the doctor blade 1002 will occupy substantially the same position at two different times in a single oscillation. Further, detectable marks, other than optically-detectable marks can be used and can include, for example, marks that are magnetically detectable, detectable using infra-red radiation, detectable using sonic waves, detectable using X-rays, or detectable based on radioactive emissions.

In addition to the image-related examples provided above, various contact switches, actuators, linear variable differential transformers (LVDTs), potentiometers or other sensors that generate an output value that can vary based on a changing position of the doctor blade could all be used to determine a position of the doctor blade within its range of oscillating travel. For example, notches or ridges could be present on a portion of the doctor blade that sequentially close/open an electrical switch so that a counter value can be used to indicate a position of the doctor blade. Further, monitoring a motor's current that is used to move the doctor blade can, based on polarity, indicate a direction of travel of the doctor blade and the period of time since that polarity has changed can provide an indication of the doctor blade's axial position.

The described sensors can not only interact with the doctor blade but can also interact with supporting structure such as a holder or arm that moves the doctor blade. For example, a shaft that drives the oscillating motion of the doctor blade, or a holder that loads the doctor blade against the roll, can have a portion that extends axially outside of the boundaries of the web of material 904. Image analysis or detecting movement of that portion of the shaft or holder may avoid some of the dirt, contaminants and other fouling that might occur closer to the web of material 904.

As the doctor blade 1002 oscillates between the two extreme positions 1010A, 1010B, different regions, e.g., region 2002A, of an axial front edge 1002A of the doctor blade 1002 that forms the nip 1006 will be positioned in alignment with varying axial locations of the sensing roll 926. Thus, as the sensing roll 926 rotates and the doctor blade 1002 oscillates, different cross-direction regions of the doctor blade 1002 will periodically be aligned with different axial locations or segments, and sensors 26A, of the sensing roll 926. If there is a variance, i.e., a defective region, along the edge 1002A of the doctor blade 1002, i.e., the doctor blade edge 1002A may have high and low areas worn into it, that forms the nip 1006, then the blade 1002 may clean different portions of the surface of the sensing roll 926 differently. For example, at a region 2002B of the doctor blade front edge 1002A that is worn compared to another region 2002A of the front edge 1002A, the worn front edge region 2002B may not clean portions of the surface of the sensing roll 926 as well as other doctor blade front edge regions clean portions of the sensing roll surface. When that sensing roll surface portion(s) that is less clean enters a region of the nip 1004 a higher pressure reading may be sensed because of additional dirt and material that is present at that sensing roll surface portion.

As described earlier with respect to the mating roll 11 and sensing roll 10, each sensor reading value from each of the sensors 26A on the sensing roll 926 is generated as each sensor is in the region of the nip 1004 and can be associated with one of the plurality of tracking segments. In the example of FIG. 10A, these tracking segments are based on the oscillation of the doctor blade 1002. Each sensor reading is associated with a concurrently occurring time based tracking segment when the tracking segments are time based or a concurrently sensed physical tracking segment when the tracking segments are based on a physical location on the blade 1002. As shown in FIGS. 10A and 10B, the region 2002A of the front edge 1002A of the doctor blade 1002 may interact with an axial segment 926A of an outer circumferential surface of the sensing roll 926 that is aligned with one of the sensors 26A when the doctor blade 1002 is at a first CD physical location 1010A or after a first amount of time has elapsed since a most recently generated starting reference signal by the signal generator 900A. However, a pressure reading value is not sensed by the sensor 26A until it enters a region of the nip 1004. Because there is distance between where the doctor blade 1002 contacts the sensing roll 926 and the nip 1004, there is a delay from when a circumferential portion of the outer surface of the sensing roll 926 at the axial segment 926A that moved under the doctor blade 1002 rotates around and enters the nip 1004. Accordingly, in one embodiment, the particular tracking segment that will be associated with the sensor reading when the sensor 26A enters a region of the nip 1004, is not determined based on when the sensor 26A moved under the doctor blade 1002, but is instead based on an elapsed time period between the most recently generated starting reference signal and the sensor 26A entering the region of the nip 1004 (for time-based tracking segments) or is based on a physical CD location of the doctor blade 1002 when the sensor 26A enters the region of the nip 1004 (for physical tracking segments). Hence, the particular tracking segment associated with the sensor reading when the sensor 26A enters a region of the nip 1004 may not correspond to the time when an axial region on the doctor blade 1002 engaged the axial and circumferential portion of the sensing roll 926 including and surrounding the sensor 26A, i.e., when that sensing roll portion including the sensor 26A passed beneath the doctor blade 1002.

In other words, the region 2002A of the front edge 1002A of the doctor blade 1002 may have an effect on an axial segment of an outer circumferential surface of the sensing roll 926 aligned with the sensor 26A, but that effect is not sensed as a pressure reading, and associated with a particular tracking segment, until the sensor 26A enters a region of the nip 1004. Alternatively, the particular tracking segment that will be associated with the sensor reading when the sensor 26A enters a region of the nip 1004, can be determined so as to correspond to the time when an axial region on the doctor blade 1002 engaged the axial and circumferential portion of the sensing roll 926 including and surrounding the sensor 26A, i.e., when that sensing roll portion including the sensor 26A passed beneath the doctor blade 1002. In particular, for time-based tracking segments for example, the amount of time that elapses between when that sensing roll portion passed beneath the doctor blade 1002 and when the sensor 26A enters the region of the nip can be used to determine when that sensing roll portion passed beneath the doctor blade. A period of oscillation of the doctor blade 1002 can be divided into, for example, 20 equal time segments that each defines a time-based tracking segment. If, when the sensor 26A enters the region of the nip 1004, an amount of time, $t_{total\_DB}$, has elapsed since the last starting reference signal occurred, then the tracking segment associated with that sensor reading can be calculated according to the formula:

$$\text{(tracking segment number)} = INT\left(TS_{DB} \cdot \left(\frac{t_{total\_DB}}{\rho_{DB}}\right)\right) + 1 \quad \text{EQ. 1}$$

where:

INT(•) is a function that extracts just an integer part of a non-integer number, $TS_{DB}$ is an integer number of tracking segments related to the oscillation of the doctor blade 1002, and in one example embodiment equals "20";

$t_{total\_DB}$ is the amount of time between when a most recent starting reference signal has occurred and when the sensor 26A enters the region of the nip 1004, and $\rho_{DB}$ is the period of oscillation of the doctor blade 1002. The time period $t_{total\_DB}$ can be considered to have two components $t_{1\_DB}$ and $t_{delay\_DB}$ such that $$t_{total\_DB} = t_{1\_DB} + t_{delay\_DB}$$

where:

$t_{1\_DB}$ is an amount of time between when the most recent starting reference signal has occurred and when the sensing roll portion around the sensor 26A passed beneath the doctor blade 1002, and $t_{delay\_DB}$ is the amount of time that elapses between when that sensing roll portion passed beneath the doctor blade 1002 and when the sensor 26A enters the region of the nip 1004. The value of $t_{delay\_DB}$ is assumed to be much shorter (e.g., half as short or even less) than $\rho_{DB}$.

When the value for $t_{delay\_DB}$ is known, the value for $t_{1\_DB}$ can be calculated according to:

$t_{1\_DB} = (t_{total\_DB} - t_{delay\_DB}))$ when $t_{total\_DB} > t_{delay\_DB}$
or $t_{1\_B} = ((t_{totalDB} + \rho_{DB}) - t_{delay\_DB}))$ when $t_{total\_DB} \leq t_{delay\_DB}$ and the tracking segment associated with the sensor reading when the sensor 26A enters the region of the nip 1004 can be calculated according to:

$$\text{(tracking segment number)} = INT\left(TS_{DB} \cdot \left(\frac{t_{1\_DB}}{\rho_{DB}}\right)\right) + 1. \quad \text{EQ. 2}$$

in this way the tracking segment associated with the sensor reading from sensor 26A can be based on when the sensing roll portion around the sensor 26A was beneath the doctor blade 1002.

When an exact value for $t_{delay\_DB}$ is not known, or it is substantially zero, then the above equation for calculating a tracking segment can still be used by assuming $t_{delay\_DB}$ is equal to "0". Under these circumstances, $t_{1\_DB}$ will be the same value as $n_{total\_DB}$ and the tracking segment associated with the sensor reading when the sensor 26A enters the region of the nip will not take into account a rotational offset, $$\frac{t_{delay\_DB}}{\rho_{DB}},$$

that represents a ratio between a) the amount of time it takes for a portion of the sensing roll to rotate from beneath the doctor blade 1002 to a region of the nip 1004 (i.e., $t_{delay\_DB}$) and b) the total period of oscillation, $\rho_{DB}$, of the doctor blade 1002.

This ratio remains substantially unchanged for minor changes in the speed of rotation of the sensing roll 926 and when multiplied by the total number of tracking segments (e.g., 20) produces the number of tracking segments that occur during $t_{delay\_DB}$.

A similar calculation can be accomplished for physical tracking segments as well where:

$L_{total\_DB}$ is a distance the doctor blade 1002 has moved since a most recent starting reference signal;

$L_{delay\_DB}$ is a distance the doctor blade 1002 moves during the time it takes the sensing roll portion around the sensor 26A to travel from beneath the doctor blade 1002 to the region of the nip 1004;

$L_{1\_DB}$ is a difference calculated by subtracting $L_{delay\_DB}$ from $L_{total\_DB}$; and $D_{DB}$ is the total amount of CD travel of the doctor blade during one complete oscillation (i.e., to the right and to the left).

Thus, the tracking segment associated with the sensor reading when the sensor 26A enters the region of the nip 1004 can be calculated according to:

$$\text{(tracking segment number)} = INT\left(TS_{DB} \cdot \left(\frac{L_{1\_DB}}{D_{DB}}\right)\right) + 1. \quad \text{EQ. 3}$$

so that the tracking segment associated with the sensor reading from sensor 26A can be based on when the sensing roll portion around the sensor 26A was beneath the doctor blade 1002.

The pressure reading values for all sensors 26A at the corresponding axial segments of the sensing roll 926 can be collected over a period of time to build a nip profile for the nip 1004 by constructing matrices similar to those of FIGS. 6-8. By synchronizing the data used to construct this nip profile with the oscillations of the doctor blade 1002, effects on pressure values within the nip 1004 due to the doctor blade 1002 may be more easily identified.

The doctor blade 1002 is depicted in FIG. 10A and FIG. 10B as forming the nip 1006 with the sensing roll 926 so as to clean the surface of the sensing roll 926. One of ordinary skill in the art will recognize that the doctor blade 1002 may alternatively be located so as to clean the outer surface of the mating roll 942. Thus, variations in the doctor blade 1002 would cause variations at different regions of the surface of the mating roll 942 that could be detected as varying pressure readings as the mating roll 942 rotates through the nip 1004 formed with the sensing roll 926.

Figure 10C:
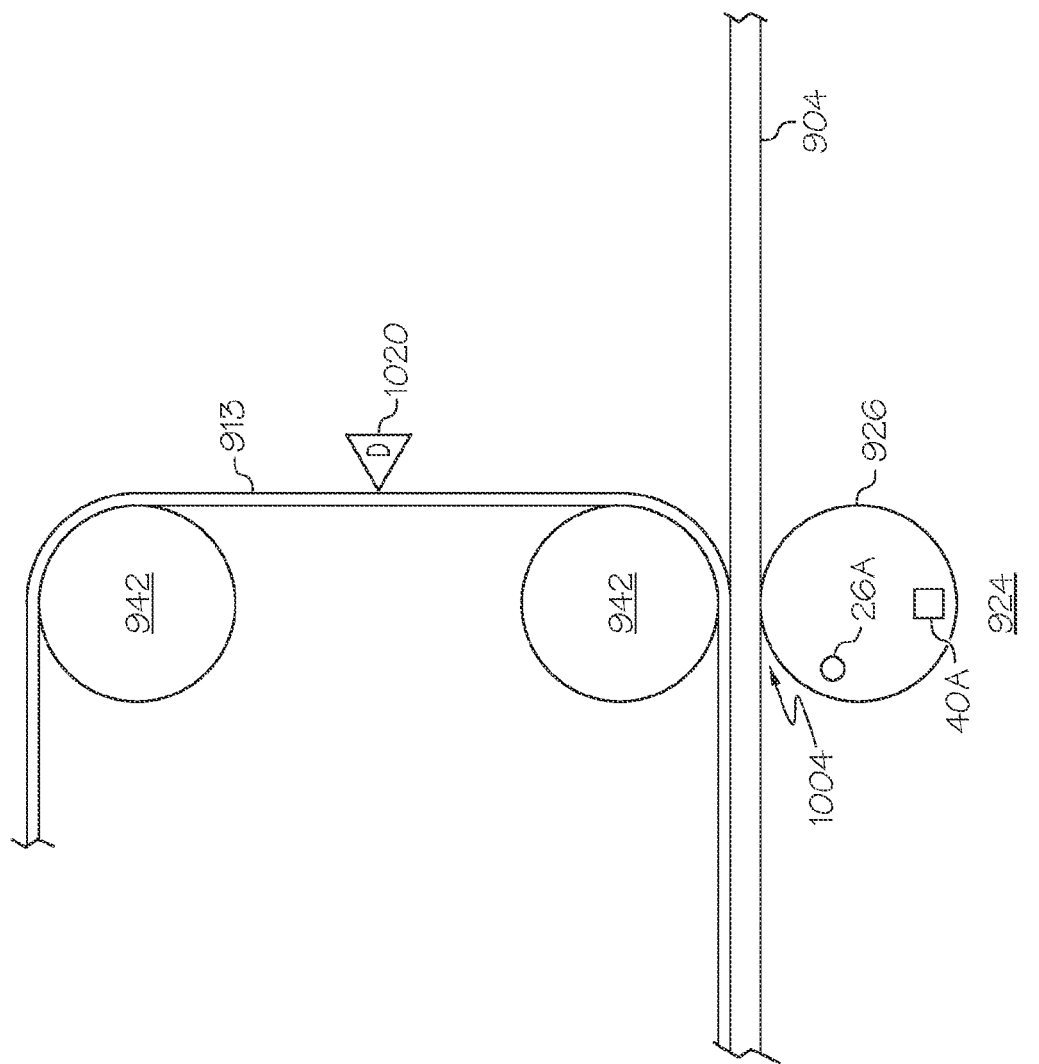

A doctor blade 1020 may also be located next to the felt 913 so that a surface of the felt 913 is cleaned, see FIG. 10C. A portion of the felt 913 that has more dirt, debris, fibers or other contaminants than other portions of the felt may not be as effective at removing water from a region of the web of material 904 when that contaminated portion of the felt comes into contact with that region of the web of material 904. As a result, that region of the web of material with a higher moisture content which was in contact with that contaminated portion of the felt 913 may cause a higher pressure reading at one of the regions of the nip 1004 as that region of the web of material passes through the nip 1004.

Another component in the papermaking process of FIG. 9 that can oscillate in the cross direction is a cleaning shower device 1102 as shown in FIG. 11A. The shower device 1102 can, for example, be located above the felt 913 and direct a shower of water, or other fluid, onto the surface of the felt 913. One of ordinary skill in the art will recognize that the shower device 1102 can also output steam, for example, and operate at a variety of different pressures. The cleaning shower device 1102 helps remove unwanted dirt, debris, fibers or other contaminants from the felt 913 so that the felt 913 can effectively remove moisture from the web of material 904 when the felt 913 is pressed into the web of material 904.

Figure 11B:
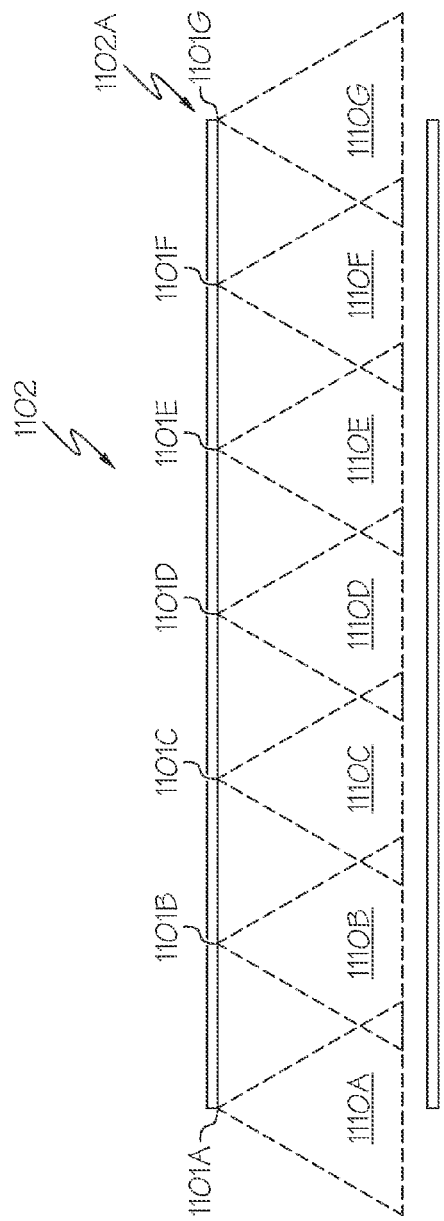

FIG. 11B is a side view of the shower device 1102 showing a cross section of the felt 913. The shower device 1102 includes a plurality of different shower heads 1101A-1101G that each provides a respective spray pattern 1110A-1110G that impacts a different axial section of the felt 913. In the examples described below, seven shower heads 1101A-1101G are depicted and described; however, this number of shower heads is merely an example and the shower device 1102 may be designed to include fewer or more shower heads without departing from the scope of the present invention. The shower device 1102 can be, for example, a wire mesh high pressure shower or a felt high pressure shower. The shower heads, or nozzles, 1101A-1101G can, for the wire mesh high pressure shower, be spaced at about 2 to 3 inches on center with a slight overlap in adjacent ones of the spray patterns 1110A-1110G, where the spray patterns 1110A-1110G contact the wire mesh 906. Thus, each of the spray patterns 1110A-1110G can be between about 2.5 to 3.5 inches in diameter at their largest. Also, for a wire mesh high pressure shower, the stroke length of the shower device 1102 in the axial direction can be about 8 to 10 inches and have a period of about 4 to 5 minutes. Alternatively, the shower heads, or nozzles, 1101A-1101G can, for the felt high pressure shower, be spaced at about 6 inches on center with a slight overlap in adjacent ones of the spray patterns 1110A-1110G. Thus, each of the spray patterns 1110A-1110G can be between about 6.5 to 7 inches in diameter at their largest. Also, for a felt high pressure shower, the stroke length of the shower device 1102 in the axial direction can be about 12-18 inches and have a period of about 3 to 4 minutes.

Figure 11C:
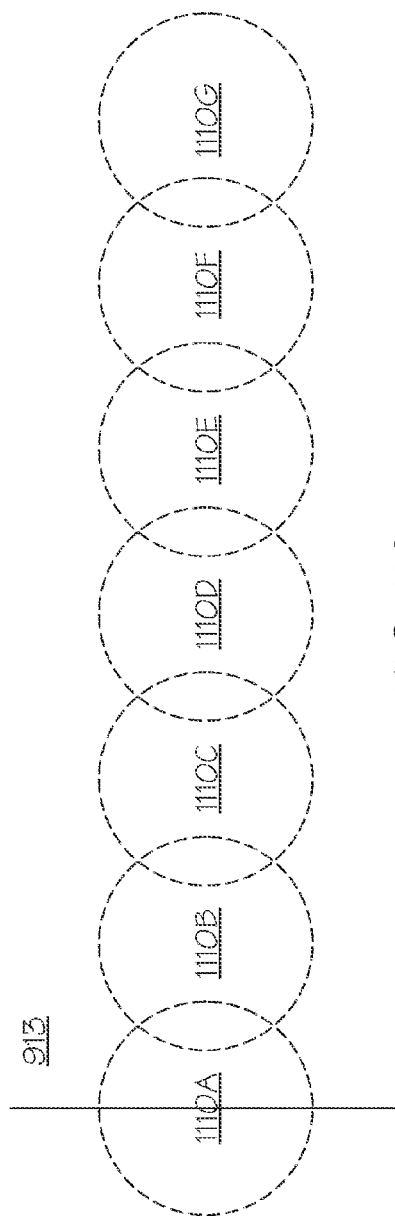

FIG. 11C is a downward view of the felt 913 from above the shower device 1102 with the shower device 1102 being omitted from the drawing so as not to obscure the spray patterns 1110A-1110G at the point when the patterns 1110A-1110G strike the felt 913. It is contemplated that a shower device 1102 could be located at position 960, as shown in FIG. 9, and used to clean the wire mesh 906 during its return path.

Figure 11D:
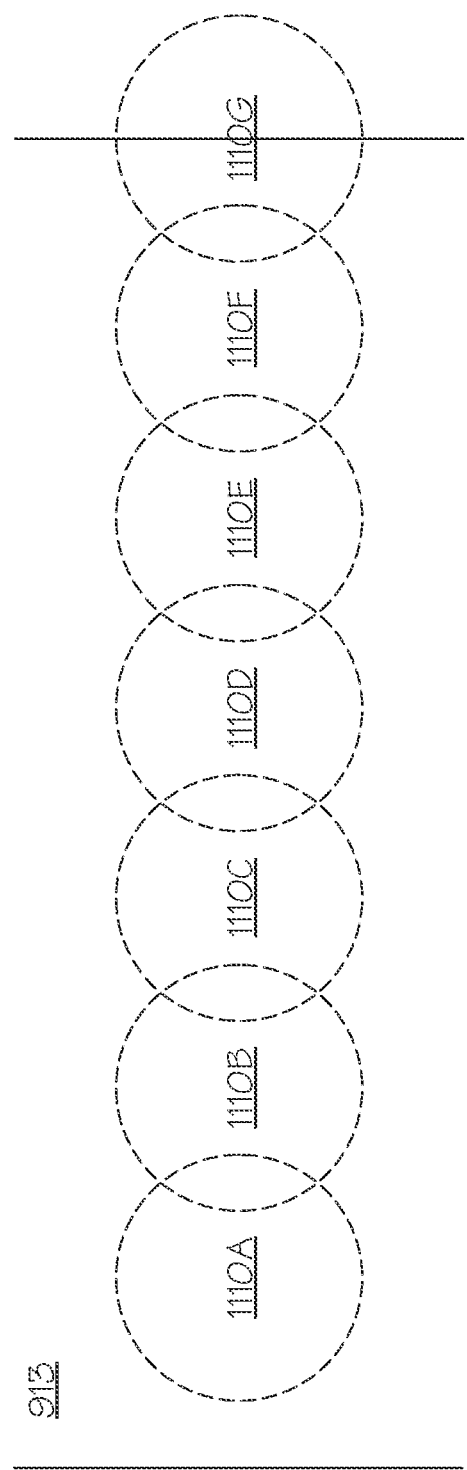

In FIG. 11C, the shower device 1102 is located so that the spray patterns 1110A-1110G are all located in a leftmost position corresponding to the shower device 1102 being located in a first or home leftmost position relative to the felt 913 while in FIG. 11D the shower device 1102 is located so that the spray patterns 1110A-1110G are all located in a rightmost position corresponding to the shower device 1102 being located in a second or rightmost position relative to the felt 913. In the examples of FIGS. 11C and 11D, the extent of the spray patterns 1110A-1110G, as they travel from the leftmost position to the rightmost position, may or may not reach the furthest edges of the felt 913. The shower device 1102 oscillates between these two extreme first leftmost and second rightmost positions. The amount of travel left-to-right of the spray device 1102 used to clean a felt, as well as each of the spray patterns 1110A-1110G, may be about 12-18 inches and the period of a complete oscillation between the two extreme first and second positions may be about 10 times the period of rotation of the sensing roll 926 (shown in FIG. 9). As mentioned above, for example, the period of rotation of the sensing roll 926 may be between about 0.2 seconds and 1.0 second and the period of oscillation for the shower device 1102 used to clean a felt from the first extreme position, to the second extreme position and back to the first extreme position may be about 3 minutes to about 4 minutes. The amount of travel left-to-right of the spray device 1102 used to clean a wire mesh, as well as each of the spray patterns 1110A-1110G, may be about 8-10 inches and the period of oscillation between the two extreme first and second positions may be hundreds of times the period of rotation of the sensing roll 926 (shown in FIG. 9). For example, the period of rotation of the sensing roll 926 may be between about 0.2 seconds and 1 second and the period of oscillation for the shower device 1102 used to clean a wire mesh from the first extreme position, to the second extreme position and back to the first extreme position may be about 4 minutes to about 5 minutes.

One of ordinary skill will recognize that the oscillating spray patterns 1110A-1110G may be accomplished using a shower device 1102 comprising a rigid shower head holder 1102A fixed to the shower heads 1101A-1101G, see FIG. 11B, that moves all of the seven shower heads 1101A-1101G back and forth in the cross direction simultaneously. Alternatively, there could be multiple shower devices 1102, each with a respective spray pattern that covers only a portion of the CD. For example, in FIG. 11C, one oscillating shower device could provide the spray patterns 1110A-1110D and a second, separately oscillating shower device could provide the spray patterns 1110E-1110G. One of ordinary skill will readily recognize that each such oscillating shower device could provide from between 1 and n spray patterns wherein n is determined by the CD length of the felt 913 (or wire mesh 906) and a size of each of the spray patterns.

A particular position of the shower device 1102 can be considered as a reference position and each time when the shower device 1102 is positioned such that it is in the reference position (e.g., in the home or leftmost position of FIG. 11C), a signal generator 900B (See FIG. 11A) produces a starting reference signal that is communicated to a processor 903A. Accordingly, upon each complete oscillation of the shower device 1102, a new starting reference signal will be generated. Also, a wireless transceiver 40A can be included on the sensing roll 926 to communicate sensor reading information to the processor 903A. A location of the shower device 1102 or, equivalently, an amount the shower device 1102 has traveled from the reference position, when a sensor reading is captured depends on an amount of time that has elapsed between when the sensor reading is captured and the most recently generated starting reference signal. Thus, the oscillation of the shower device 1102 can be segmented into a plurality of tracking segments that each can be represented by a) a different fragment or portion of the period of oscillation of the shower device 1102 or b) a different physical location of the shower device 1102 between the two extreme positions of FIGS. 11C and 11D.

Another alternative technique for determining where the shower device 1102 is positioned in a particular oscillation could utilize an image capturing device (e.g., a camera) and an image analyzer (e.g., software, hardware, or a combination of both). The image capturing device could be positioned so as to have a field of view that includes an edge of or point on the shower device 1102 over its entire amount of oscillating travel. Alternatively, an optically-detectable mark could be incorporated with the shower device 1102 and the image capturing device's field of view would include that optically-detectable mark over its entire range of oscillating travel. The image capturing device would capture a series of images of the shower device 1102 and an image analysis process could then analyze an image to determine at which tracking segment the shower device 1102 is located based on a position of the edge, point or the optically-detectable mark within an image frame. By comparison of a position of the shower device 1102 in a current image frame with its position in a previous image frame, the image analysis process could determine which direction the shower device 1102 is traveling, as well. This is beneficial because the shower device 1102 will occupy substantially the same position at two different times in a single oscillation. Further, detectable marks, other than optically-detectable marks can be used and can include, for example, marks that are magnetically detectable, detectable using infra-red radiation, detectable using sonic waves, detectable using X-rays, or detectable based on radioactive emissions.

As described above with respect to determining a position of a doctor blade in the CD, or axial direction, various sensors, switches, current monitors, and electrical circuits can be utilized to sense portions of the shower device 1102 or other structure that is affixed to the shower device 1102 and travels in the same oscillatory pattern as the shower device 1102.

As described earlier with respect to the mating roll 11 and sensing roll 10, each sensor reading value from each of the sensors 26A on the sensing roll 926, as each sensor is in the region of the nip 1004, its generated reading value can be associated with one of the plurality of tracking segments. In the example of FIGS. 11A-FIG. 11D, these tracking segments are based on the oscillation of the shower device 1102.

Because, as shown in FIG. 11A, there is distance between where the shower device 1102 is located over the felt 913 and the nip 1004, there is a delay from when a portion 980 of the felt is impacted by one of the spray patterns 1110A-1110G and when that portion 980 of the felt 913 eventually rotates around and enters the nip 1004. Accordingly, the particular tracking segment that will be associated with the sensor reading when the sensor 26A enters a region of the nip 1004, is not determined, in one embodiment, based on when the portion 980 was impacted by the spray pattern, but is instead based on an elapsed time period between the most recently generated starting reference signal and the sensor 26A entering the region of the nip 1004 (for time-based tracking segments) or is based on a physical CD location of the shower device 1102 when the sensor 26A eventually enters the region of the nip 1004 (for physical tracking segments).

Alternatively, the particular tracking segment that will be associated with the sensor reading when the sensor 26A enters a region of the nip 1004, can be determined so as to correspond to the time when felt portion 980 passed beneath the shower device 1102. In particular, for time-based tracking segments, for example, the amount of time that elapses between when the portion 980 of the felt 913 passed beneath the shower device 1102 and when the sensor 26A enters the region of the nip 1004 concurrent with that portion 980 can be used to determine when that portion 980 passed beneath the shower device 1102. A period of oscillation of the shower device 1102 can be divided into, for example, 200 equal time segments that each defines a time-based tracking segment. If, when the sensor 26A enters the region of the nip 1004, an amount of time, $t_{total\_SD}$, has elapsed since the last starting reference signal occurred, then the tracking segment associated with that sensor reading can be calculated according to the formula:

$$\text{(tracking segment number)} = INT\left(TS_{SD} \cdot \left(\frac{t_{total\_SD}}{\rho_{SD}}\right)\right) + 1 \quad \text{EQ. 4}$$

where:

$INT(\cap)$ is a function that extracts just an integer part of a non-integer number, $TS_{SD}$ is an integer number of tracking segments related to the oscillation of the shower device 1102, and in one example embodiment equals "200";

$t_{total\_SD}$ is the amount of time between when a most recent starting reference signal has occurred and when the sensor 26A enters the region of the nip 1004, and $\rho_{SD}$ is the period of oscillation of the shower device 1102.

The time period $t_{total\_SD}$ can be considered to have two components $t_{1\_SD}$ and $t_{delay\_SD}$ such that $$t_{total\_SD} = t_{1\_SD} + t_{delay\_SD}$$

where:

$t_{1\_SD}$ is an amount of time between when the most recent starting reference signal has occurred and when the portion 980 of the felt 913 passed beneath the shower device 1102, and $t_{delay\_SD}$ is the amount of time that elapses between when that portion 980 passed beneath the shower device 1102 and when the portion 980 enters the region of the nip 1004.

An example period for the felt 913 may be between about 2 to 5 seconds (depending upon a length of the felt 913 and the speed at which it is traveling). Assuming the shower device 1102 is positioned shortly after the nip, the delay period $t_{delay\_SD}$ would at most be 2 to 5 seconds and, as mentioned above, the typical period $\rho_{SD}$ for a felt shower is around 3 to 4 minutes and the typical period $\rho_{SD}$ for a mesh, or wire, shower is around 4 to 5 minutes. Thus, even when an exact value for $t_{delay\_SD}$ is not known, $t_{delay\_SD}$ can be assumed to typically be less than $\rho_{SD}$. Under these circumstances, the above equation can still be used to calculate a tracking segment value if $t_{delay\_SD}$ is assumed to equal "0". Thus, $t_{1\_SD}$ will be the same value as $t_{total\_SD}$ and the tracking segment associated with the sensor reading when the sensor 26A enters the region of the nip will not take into account a rotational offset ratio, $$\frac{t_{delay\_SD}}{\rho_{SD}},$$

that represents a ratio between a) the amount of time it takes for a portion of the felt 913 to travel from beneath the shower device 1102 to a region of the nip 1004 (i.e., $t_{delay\_SD}$ and b) the total period of oscillation, $\rho_{SD}$, of the shower device 1102. This ratio remains substantially unchanged for minor changes in the speed of rotation of the sensing roll 926, and/or the speed of travel of the felt 913, and when multiplied by the total number of tracking segments (e.g., 200) produces the number of tracking segments that occur during $t_{delay\_SD}$.

As just mentioned, the value of $t_{delay\_SD}$ is assumed to be much shorter (e.g., half as short or even less) than $\rho_{SD}$. However, when the value for $t_{delay\_SD}$ is longer than the oscillation period $\rho_{SD}$ of the shower device 1102, the value $t_{total\_SD}$ can be calculated in a way that ignores $\rho_{SD}$ and, instead, relies on the difference between $t_{delay\_SD}$ and $\rho_{SD}$, or some integer multiple of $\rho_{SD}$. Thus, the time period $t_{total\_SD}$ can more generically be considered to have two components $t_{1\_SD}$ and $t_{diff\_SD}$ such that $$t_{total\_SD} = t_{1\_SD} + t_{diff\_SD}$$

where:
- $t_{1\_SD}$ is an amount of time between when the most recent starting reference signal has occurred and when the portion 980 of the felt 913 passed beneath the shower device 1102, and
- $t_{diff\_SD}$ is the amount of time that $t_{delay\_SD}$ exceeds an integer multiple of $\rho_{SD}$ and can calculated according to:

$$t_{diff\_SD} = \text{MOD}(t_{delay\_SD}, \rho_{SD})$$

where MOD(•) is a function that returns the remainder when its first argument is divided by its second argument $$\left(\text{i.e., } \frac{t_{delay\_SD}}{\rho_{SD}}\cdot\right);$$

When the value for $t_{diff\_SD}$ is known, the value for $t_{1\_SD}$ can be calculated according to:

$$t_{1\_SD} = (t_{total\_SD} - t_{diff\_SD})), \text{ when } t_{total\_SD} > t_{diff\_SD} \text{ or}$$

$$t_{1\_SD} = ((t_{total_{SD}} + \rho_{SD})t_{diff\_SD}), \text{ when } t_{total\_SD} \leq t_{diff\_SD}$$

and the tracking segment associated with the sensor reading when the sensor 26A enters the region of the nip 1004 can be calculated according to:

$$\text{(tracking segment number)} = INT\left(TS_{SD} \cdot \left(\frac{t_{1\_SD}}{\rho_{SD}}\right)\right) + 1. \quad \text{EQ. 5}$$

In this way the tracking segment associated with the sensor reading from sensor 26A can be based on when the portion 980 of the felt was beneath the shower device 1102.

When $t_{delay\_SD}$ and $t_{diff\_SD}$ are not known, then the associated tracking segment can be calculated using the earlier formula based on $n_{total\_SD}$ rather than the above formula based on $t_{1\_SD}$ which is the same as assuming the value of $t_{delay\_SD} = 0$. In the examples described below with respect to FIGS. 12B and 13A(1)-13E, the tracking segments are calculated according to EQ. 5 such that the particular tracking segment that will be associated with the sensor reading when the sensor 26A enters a region of the nip 1004, can be determined so as to correspond to the time when felt portion 980 passed beneath the shower device 1102.

A similar calculation can be accomplished for physical tracking segments as well where:
- $L_{total\_SD}$ is a distance the shower device 1102 has moved since a most recent starting reference signal;
- $L_{delay\_SD}$ is a distance the shower device 1102 moves during the time it takes the sensing roll portion around the sensor 26A to travel from beneath the shower device 1102 to the region of the nip 1004;
- $L_{1\_SD}$ is a difference calculated by subtracting $L_{delay\_SD}$ from $L_{total\_SD}$; and
- $D_{SD}$ is the total amount of CD travel of the shower device 1102 during one complete oscillation (i.e., to the right and to the left).

Thus, the tracking segment associated with the sensor reading when the sensor 26A enters the region of the nip can be calculated according to:

$$\text{(tracking segment number)} = INT\left(TS_{SD} \cdot \left(\frac{L_{1\_SD}}{D_{SD}}\right)\right) + 1. \quad \text{EQ. 6}$$

so that the tracking segment associated with the sensor reading from sensor 26A can be based on when the portion 980 of the felt 913 was beneath the shower device 1102.

These pressure reading values for all sensors at all of the axial segments of the sensing roll 926 can be collected over a period of time to build a nip profile for the nip 1004 by constructing matrices similar to those of FIGS. 6-8 and also a sum-squared matrix as described earlier. By synchronizing the data used to construct this nip profile with the oscillations of the shower device 1102, effects on pressure values within the nip 1004 due to the shower device 1102 may be more easily identified.

Figure 12A:
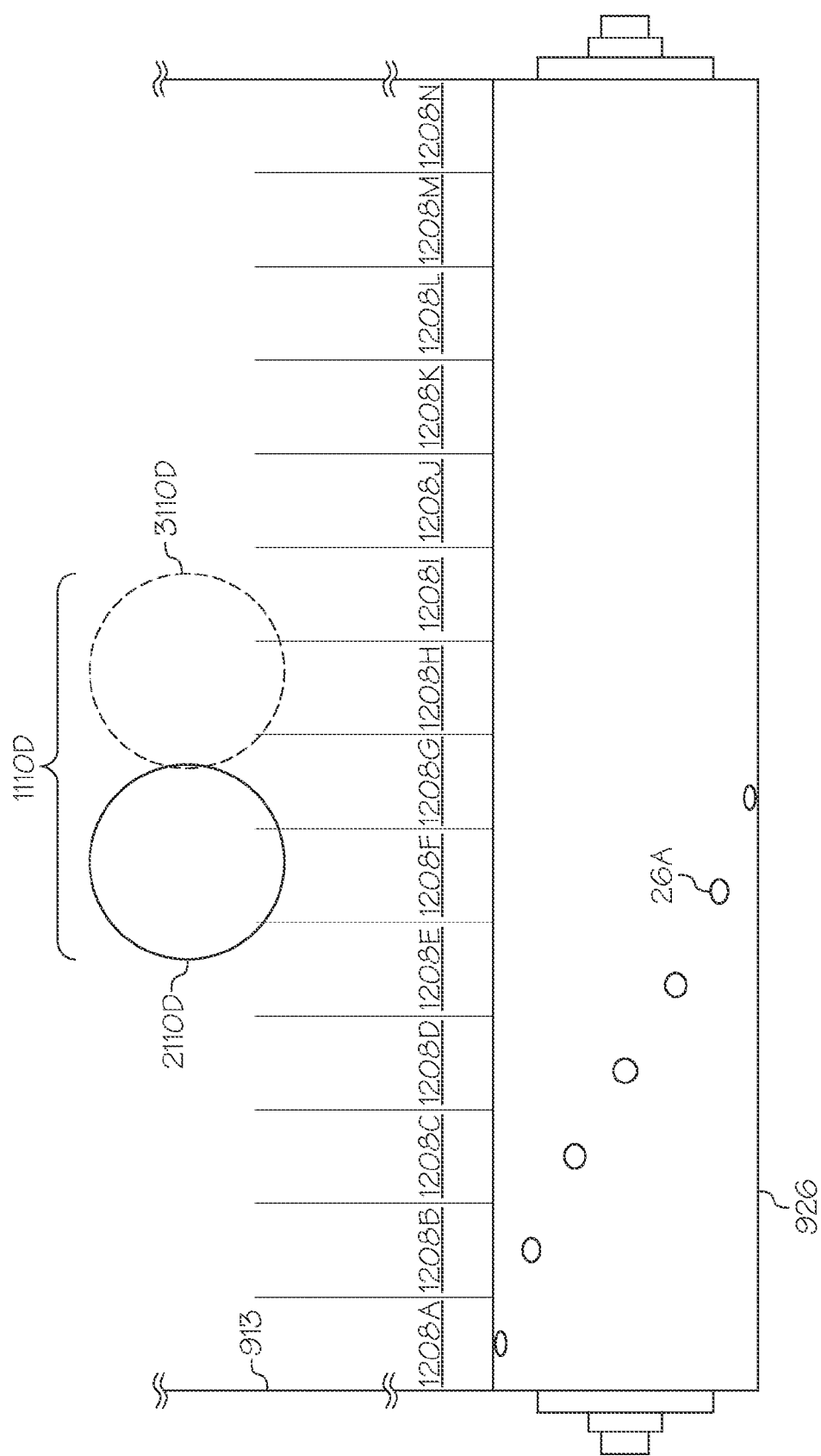
FIG. 12A illustrates one specific axial segment affected by an oscillating cleaning show in accordance with the principles of the present invention.

FIG. 12A is a conceptual illustration showing the felt 913, a single oscillating spray pattern 1110D from the shower head 1101D of the shower device 1102, with the spray pattern 1110D shown in solid line at a leftmost location 2110D and in phantom at a rightmost location 3110D and the sensing roll 926 arranged in a manner that illustrates how the various elements align in the axial direction or cross direction.

As mentioned earlier, the sensing roll 926 includes a plurality of axially spaced apart sensors 26A that each pass through a different axial region of the nip 1004 (See FIG. 10B). Each of these sensors 26A is aligned with a respective axial segment 1208A-1208N such that each of the sensors 26A corresponds to one of the plurality of axial segments 1208A-1208N. The axial segments 1208A-1208N can be used to refer to any element that extends in the cross direction such as the sensing roll 926 or the felt 913. Accordingly, the axial segments 1208A-1208N are shown conceptually in FIG. 12A as extending from the sensing roll 926 to and along the felt 913 in order to illustrate how the axial segments 1208A-1208N correspond to one another for all the elements (e.g., sensing roll 926, shower device 1102, felt 913, etc.).

In FIG. 12A, one particular felt axial segment 1208F (e.g., the 6$^{th}$ axial segment from the left) is shown that is impacted by the oscillating shower spray pattern 1110D that oscillates between its leftmost location 2110D and its rightmost location 3110D. The spray pattern 1110D moving between the spray pattern locations 2110D, 3110D (and all the intermediate spray pattern locations between these two) operates so as to clean portions of the axial segment 1208F of the felt 913 as well as portions of nearby axial segments 1208E and 1208G-1208I. When a portion of the felt axial segment 1208F enters a region of the nip 1004 along with the sensor 26A at a corresponding axial location, a pressure reading at that axial region of the nip sensed by the sensor 26A can be affected by how well the spray pattern 1110D moving between the locations 2110D and 3110D was able to clean the felt axial segment 1208F.

For example, when the spray pattern 1110D moving between the locations 2110D and 3110D is able to clean portions of the axial segment 1208F of the felt 913, which portions the spray pattern 1110D strikes, then those cleaned portions of the axial segment 1208F of the felt 913 may be able to absorb more moisture as compared to if those portions had not been cleaned such that when a cleaned portion of the felt axial segment 1208F travels through the nip 1004 along with the web of material 904, a reduced pressure reading is sensed. It is noted that moisture is pulled from the felt 913 via vacuum prior to the felt 913 passing through the nip 1004. In contrast, when the spray pattern 1110D or other spray patterns are unable to clean portions of the axial segment 1208F of the felt 913, then uncleaned portions of the felt axial segment 1208F may not be able to absorb much moisture from the web of material 904. Thus, when an uncleaned portion of the felt axial segment 1208F travels through the nip 1004 along with the web of material 904, an increased amount of moisture being present in the web of material and/or solids (e.g., ash and fiber) in the felt may result in an elevated pressure reading being sensed.

Figure 12B:
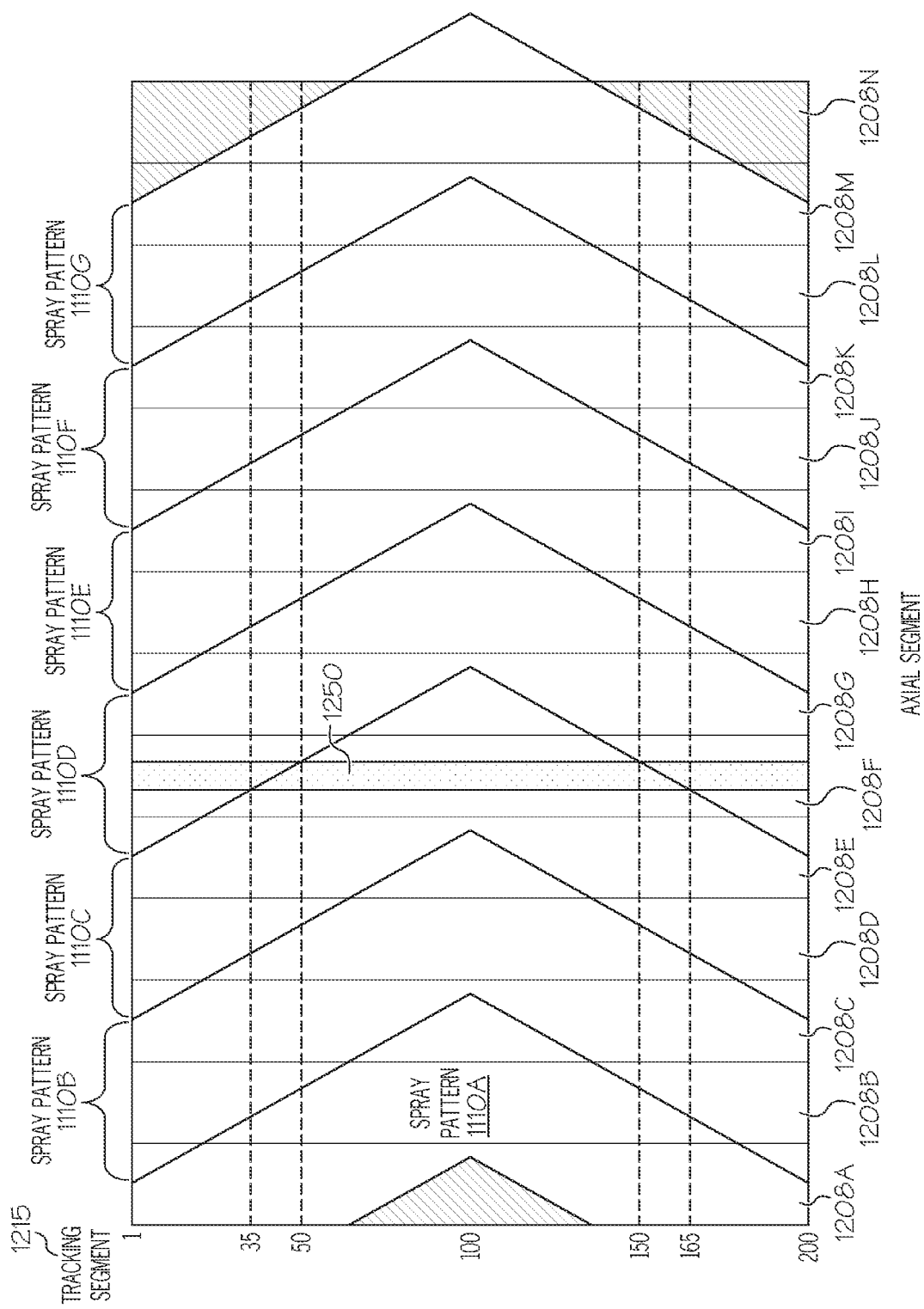
FIG. 12B illustrates a conceptual depiction of a path of a cleaning shower relative to all the axial segments during one complete oscillation in accordance with the principles of the present invention, FIGS. 13A(1)-13E illustrate how sensor readings can be collected so as to be associated with different tracking segments of an oscillating component in accordance with the principles of the present invention.

FIG. 12B illustrates a conceptual depiction of paths of the spray patterns 1110A-1110G relative to all of the felt axial segments 1208A-1208N, during one complete oscillation of the shower device 1102 in accordance with the principles of the present invention. FIGS. 13A(1)-13A(6) are a table of simulated data that corresponds to the arrangement illustrated in FIG. 12A and FIG. 12B for a single oscillating spray pattern 1110D from the shower head 1101D of the shower device 1102.

FIG. 12B shows conceptually how axial positions of the spray patterns 1110A-1110G vary during one oscillation of the shower device 1102 by depicting the 14 (for example) axial segments 1208A-1208N along the x-axis and 200 (for example) tracking segments 1215 along the y-axis. Focusing on the $4^{th}$ from the left spray pattern 1110D, for example, at the top of the y-axis and corresponding to tracking segment 1, the shower device 1102 is at its leftmost position such that the spray pattern 1110D is covering the sixth felt axial segment 1208F. More particularly, the spray pattern 1110D is covering a central portion 1250 of the sixth felt axial segment 1208F. This central region 1250 represents the general area of the sixth felt axial segment 1208F that has a significant effect on the pressure readings sensed by the sensor 26A aligned with the sixth axial segment 1208F. As the shower device 1102 oscillates to the right, this corresponds to later tracking segments 1215 which are higher in number and lower on the y-axis.

At around tracking segment 35, the third spray pattern 1110C starts to increase its coverage of the central portion 1250 as the coverage of the fourth spray pattern over the central portion 1250 decreases. At tracking segment 50, the fourth spray pattern 1110D is no longer covering any part of the central portion 1250 of the sixth felt axial segment 1208F. Instead, the third spray pattern 1110C is now covering the central portion 1250 of the sixth felt axial segment 1208F. The third spray pattern 1110C continues to cover the sixth felt axial segment 1208F as the shower device 1102 continues its oscillation to its right most position (i.e., tracking segment 100) and then starts traveling back to the left. When the shower device 1102 returns to a position corresponding to the tracking segment 150, the third spray pattern 1110C starts to no longer fully cover the central portion 1250 of the sixth felt axial segment 1208F while the fourth spray pattern 1110D begins to cover more and more of the central portion 1250 of the sixth felt axial segment 1208F between tracking segments 150 to 165. From tracking segment 165 to 200, the central portion 1250 of the sixth felt axial segment 1208 is covered by the fourth spray pattern 1110D.

As mentioned above, the associating of a pressure reading with a tracking segment occurs based on an oscillation time period (or position) of the shower device 1102 when a sensor 26A enters a region of the nip 1004 and because the shower device 1102 is located at a particular distance from the nip 1004, there is a delay between when the shower device affects or impacts a portion 980 (See FIG. 11A) of the felt 913 and when that portion 980 travels to and enters a region of the nip 1004. This delay, however, can be accounted for by calculating the tracking segment to associate with a sensor reading according to EQ. 5 above. Accordingly, the illustration of FIG. 12B and the discussion below of FIGS. 13A(1)-13E, for this example, is conceptual in nature in that a portion of the felt 913 that is being cleaned by the shower device 1102 when the shower device 1102 is in its leftmost position is considered to be associated with tracking segment #1 even though that portion of the felt 913 will not actually enter a region of the nip 1004 until a later time.

The table of FIGS. 13A(1)-13A(6) corresponds to simulated data sensed by sensor 26A aligned with the sixth felt axial segment 1208F if only a single shower head 1101D is providing a spray pattern that cleans that felt axial segment 1208F (i.e., spray pattern 1110D). For example, such a situation may occur if the third shower head 1101C is clogged so that there is no spray pattern 1110C in FIG. 12B. The oscillation of the shower device 1102 and hence, also of the spray pattern 1110D between the locations 2110D and 3110D, is broken into 200 tracking segments. In this example, the 200 tracking segments comprise an equal portion or segment of the period of oscillation of the shower device 1102. For purposes of the simulated data of FIGS. 13A(1)-13A(6), the convention used in FIG. 12B continues such that the first tracking segment corresponds to when the spray pattern 1110D is at its leftmost location 2110D. In the illustrated embodiment, the alignment of the showerhead 1101D is such that at the leftmost location 2110D the spray pattern 1110D is spraying, or cleaning, the central portion 1250 of the sixth felt axial segment 1208F that is aligned with the sensor 26A shown in FIG. 12A and FIG. 12B. As the oscillating travel of the spray pattern 1110D continues to the right, eventually the central portion 1250 of the felt axial segment 1208F is no longer being sprayed by the spray pattern 1110D. Upon the spray pattern 1110D reaching the right most position 3110D, the spray pattern 1110D reverses direction and travels to the left where it will eventually returns to a position where it is spraying the central portion 1250 of the sixth felt axial segment 1208F. The spray pattern 1110D will oscillate from the leftmost spray pattern location 2110D to the rightmost spray pattern location 3110D and back to the leftmost spray pattern location 2110D to complete an oscillation with 200 tracking segments occurring at evenly spaced apart time intervals during each complete oscillation of the shower device 1102 in an embodiment of the present invention. As the one sensor 26A at an axial location corresponding to sixth felt axial segment 1208F enters a region of the nip 1004 (see FIGS. 10A and 12A), a sensed pressure reading is associated with one of the 200 tracking segments.

In the earlier example involving FIGS. 6-8, there were 14 different axial segments or sensors 26A. The column of simulated data 1304 of FIGS. 13A(1)-13(6) is analogous to one of the 14 columns of FIG. 8 (e.g., the $6^{th}$ column). Accordingly, a full "averages" matrix for a profile of the nip 1004 would include 200 rows and 14 columns so as to have 2800 distinct elements. The one column of simulated data 1304 in FIGS. 13A(1)-13A(6) is data sensed by the sensor 26A located at an axial location corresponding to the sixth felt axial segment 1208F. Each row in the leftmost column 1302 of the simulated data of FIGS. 13A(1)-13A(6) corresponds to one of the 200 tracking segments of the shower device 1102.

Returning briefly to FIG. 12A and FIG. 12B, the spray pattern 1110D sprays only a limited number of the felt axial segments 1208E-1208I in its complete range of travel and adjacent spray patterns 1110C and 1110E will likely overlap some of those felt axial segments 1208E-1208I as well, as depicted in FIG. 12B. Thus, if the data sensed with sensor 26A indicates that there may be a problem with how well portions of the felt 913 are being cleaned at the felt axial location 1208F, this problem can be traced to just a limited number (e.g., 1101C and 1101D) of the shower heads 1101A-1101G of the shower device 1102. Accordingly, an investigation can be made into whether one or more shower heads are defective or clogged, whether adjacent spray patterns overlap sufficiently, whether shower heads should be spaced closer together, whether more water pressure of the shower spray would be beneficial, and whether the oscillating speed of the shower device 1102 should be changed, e.g., slowed.

The simulated data of FIGS. 13A(1)-13(6) simulates collecting data during a substantial number of oscillations of the shower device 1102, e.g., 100 oscillations, with only the shower head 1101D providing a spray pattern 1110D, such that most or all of the elements 1306 in the column 1304 contain a value representing an average pressure value associated with a particular axial segment (e.g., corresponding to and aligned with felt axial segment 1208F) and a particular one of the 200 tracking segments (e.g., #2).

In the example embodiment described above, the first tracking segment corresponds to when the spray pattern 1110D is at its leftmost location 2110D and the 100$^{th}$ tracking segment corresponds to when the spray pattern 1110D is at its rightmost location 3110D, see FIG. 12A. This particular correlation between spray pattern location and tracking segment is merely an example which is based on the leftmost location 2110D being a reference location from which each oscillation is considered to begin. Thus, there is no requirement that the shower heads be aligned in a particular way with the axial segments at the rightmost or leftmost position.

One alternative to the above example with tracking segment #1 corresponding to the leftmost position would be to consider an oscillation to start when the spray pattern 1110D is in-between the two extreme positions 2110D, 3110D. For example, if the starting position was considered to be centered between the leftmost and the rightmost positions, then the tracking segment #1 occurs at this center position and, assuming the oscillation travels from left to right, the 50$^{th}$ tracking segment corresponds to when the spray pattern 1110D is at its rightmost position 3110D. Also, the 150$^{th}$ tracking segment corresponds to when the spray pattern 1110B is at its leftmost position 2110D.

The graphs of FIG. 13B-13E illustrate a progression of collecting simulated data involving 20,000 samples for the one sensor 26A aligned with and corresponding to the felt axial segment 1208F, again with only the shower head 1101D providing a spray pattern 1110D. In FIG. 13B, raw data signals 1310 are collected (e.g., 1000 sequential samples) that represent a pressure value sensed by sensor 26A as it travels through a region of the nip. It is these samples 1310 that are associated with one of the 200 tracking segments in order to be time synchronized with the oscillating period, or position, of the shower head. For example, in FIG. 13C, the x-axis spans from tracking segment #1 1320 to tracking segment #200 1322. The y-axis represents an average pressure reading (in pounds/in$^2$) for each of the 200 tracking segments for an axial segment corresponding to the sixth felt axial segment 1208F. The average pressure readings for each of the 200 tracking segments is influenced by the felt 913 traveling through a region of the nip 1004, the web of material traveling through the region of the nip 1004 and, also, by the rotating mating roll 942. Accordingly, the time synchronized signal 1312 of FIG. 13C which only includes 1,000 samples sensed by the sensor 26A may not clearly show a pattern that is correlated with the oscillation of the shower head 1101D.

As more samples are collected and used to build the matrices similar to FIGS. 6-8 having 200 tracking segments, a pattern correlated with the oscillation of the shower head 1101D can become clearer. As shown in FIG. 13D, the signal 1314 representing the 200 tracking segments for sensor 26A aligned with the sixth felt axial segment, or axial location, 1208F has a region 1313 that is seemingly relatively higher in value than the two side regions 1311 and 1315. This pattern becomes clearer in the graph of FIG. 13E corresponding to 20,000 samples.

A lower pressure reading corresponds to a pressure value sensed when a portion of the felt 913 traveling through a region of the nip 1004 is relatively clean. Conversely, a higher pressure reading corresponds to a pressure value sensed when a portion of the felt 913 traveling through the nip 1004 is not relatively clean and contains dirt, debris, fibers or other contaminants and, hence, a corresponding portion of the web of material has a higher amount of moisture. The presence of the contaminants and/or the additional moisture may result in this higher pressure reading.

The simulated data of FIG. 13C-13E assumes that tracking segment #1 1320, as mentioned above, corresponds to when the spray pattern 1110D is at location 2110D and is spraying, or cleaning the central portion 1250 of the axial segment 1208F aligned with the sensor 26A. A second assumption is that spray pattern 1110D at location 2110D corresponding to the tacking segment #1 affects a portion of the web of material 904 such that when that portion of the web of material eventually reaches a region of the nip 1004 and a pressure is sensed, that the sensed pressure is associated with tracking segment #1. This is possible by calculating tracking segments according to EQ. 5 above which essentially calculates:

a) a total time or value between a starting reference signal and when a portion of the felt 913 enters a region of the nip along with a sensor 26A, b) a delay time period from when that portion of the felt 913 passed under the shower device 1102 and entered the region of the nip 1004, and c) a tracking segment based on the difference between a) and b).

Thus, the simulated data of FIG. 13E starts at tracking segment #1 1320 when the spray pattern 1110D is at the leftmost location 2110D and is spraying, or cleaning, the axial segment 1208F aligned with the sensor 26A. The spray pattern 1110D then moves relative to that initial alignment to the rightmost location 3110D at tracking segment #100 where it is no longer cleaning, or spraying, the axial segment 1208F aligned with the sensor 26A. The spray pattern 1110D then travels so as to return to the initial spray pattern location 2110D. Accordingly, for tracking segment #1 1320 and tracking segment #200 1322, the spray pattern 1110D is located at its leftmost location 2110D.

As mentioned above, the simulated data of FIG. 13E corresponds to a single shower head 1101D providing a single spray pattern 1110D on portions of axial segment 1208F because the adjacent shower head 1101C is faulty. Thus, the simulated data can more clearly show the effect of a spray pattern on pressure values sensed by the sensor 26A. If the adjacent spray pattern 1110C were operational, it would also have an effect on some of the pressure values sensed by the sensor 26A corresponding to felt axial segment 1208F. The simulated data of FIG. 13E illustrates that when the spray pattern 1110D is located near spray pattern location 2110D, the average pressure reading for nearby tracking segments are relatively low. However, the further the spray pattern 1110D travels towards the rightmost spray pattern location 3110D, higher average pressure readings occur. In FIG. 13E, graph regions 1330 and 1338 include tracking segments that correspond to repeating, relatively clean portions of the felt 913 at the particular felt axial location 1208F that are cleaned, or sprayed, by the spray pattern 1110D. Comparing FIG. 12B with FIG. 13E, the region 1330 of FIG. 13E corresponds to the region above tracking segment 35 of FIG. 12B. The region 1338 of FIG. 13E similarly corresponds to the region below tracking segment 165 of FIG. 12B.

The graph region 1334 includes tracking segments that correspond to repeating, relatively unclean portions of the felt 913 at the particular felt axial location 1208F that are not sprayed, or cleaned, by the spray pattern 1110D. This graph region 1334 would correspond to the region of FIG. 12B between the tracking segments 50 and 150 where the spray pattern 1110C from hypothetically non-functional shower head 1101C is missing and failing to clean the central portion 1250 of the sixth axial segment 1208F. The graph regions 1332 and 1336 include tracking segments that are in a transition region between the sprayed and unsprayed portions. The region 1332 corresponds to the region of FIG. 12B between tracking segments 35 to 50 and the region 1336 of FIG. 13E corresponds to the region of FIG. 12B between tracking segments 150 and 165.

Thus, the simulated data of FIG. 13E suggests that corrective action with the shower device 1102 can be taken which improves the cleaning of the felt axial segment 1208F. In particular the spray pattern 1110D striking the felt axial segment 1208F can be adjusted so as to be wider. Alternatively, or in addition to that corrective action, a neighboring spray pattern can be adjusted so as to overlap the felt axial segment 1208F or an adjacent shower head (e.g., 1101C) may be plugged or malfunctioning and appropriate corrective action taken. In the above example, it is this latter scenario which is the problem.

In addition to the time-based techniques described above for identifying different tracking segments associated with an oscillating component, alternative techniques are contemplated as well. For example, an oscillating component could include multiple, evenly-spaced marks that could be detected (e.g., optically) and counted as each such mark passes a location of a sensor or detector. A reference mark could be provided and would be distinctive from all the other marks such that when the sensor detects the reference mark, the counter circuitry resets and starts counting from an initial value (e.g., "0" or "1"). As an example, each evenly-spaced mark could be a single tick mark, a tick mark of a particular width, or a mark of a particular color. The reference mark could be a double-tick mark, a thicker (or thinner) tick mark, or a mark of a unique color. The marks would function so as to separate the oscillation of the oscillating component into different segments and a counter, or similar circuitry, would increment a count each time a mark was detected so that any collected data could be associated with one of the segments of the oscillating component. Accordingly, there may be structure for generating a starting reference that includes a detector proximate to the surface of the oscillating component for detecting each of the plurality of marks traveling by the detector; and a signal generator in communication with the detector for generating the starting reference each time the distinctive reference mark is detected. Furthermore there may also be a counter in communication with the detector for counting a number of the plurality of marks that have been detected since the most recent starting reference, wherein a value related to an amount the oscillating component has oscillated is equal to the number of the plurality of marks that have been detected since the most recent starting reference. Also, as an example, the generating of the starting reference can be accomplished by resetting the counter to an initial value (e.g., "0" or "1" as mentioned above). If the techniques of segmenting the oscillation of the oscillating component just described were utilized, then it would be unnecessary to explicitly measure an elapsed time since the most recent generation of a reference timing signal that is generated each oscillation of the oscillating component; instead, detection and counting of tick marks could be used to define a plurality of count-based tracking segments. Such a "count-based" technique for synchronization of pressure data is more fully described in related patent application, U.S. patent application Ser. No. 14/735,892 entitled COUNT-BASED MONITORING MACHINE WIRES AND FELTS, the disclosure of which is incorporated herein by reference in its entirety. Also, as described above, any of a wide variety of other techniques involving position feedback, such as potentiometers or linear variable differential transformers, could be used as well to track a position of an oscillating component such as a doctor blade or cleaning shower.

Figure 14:
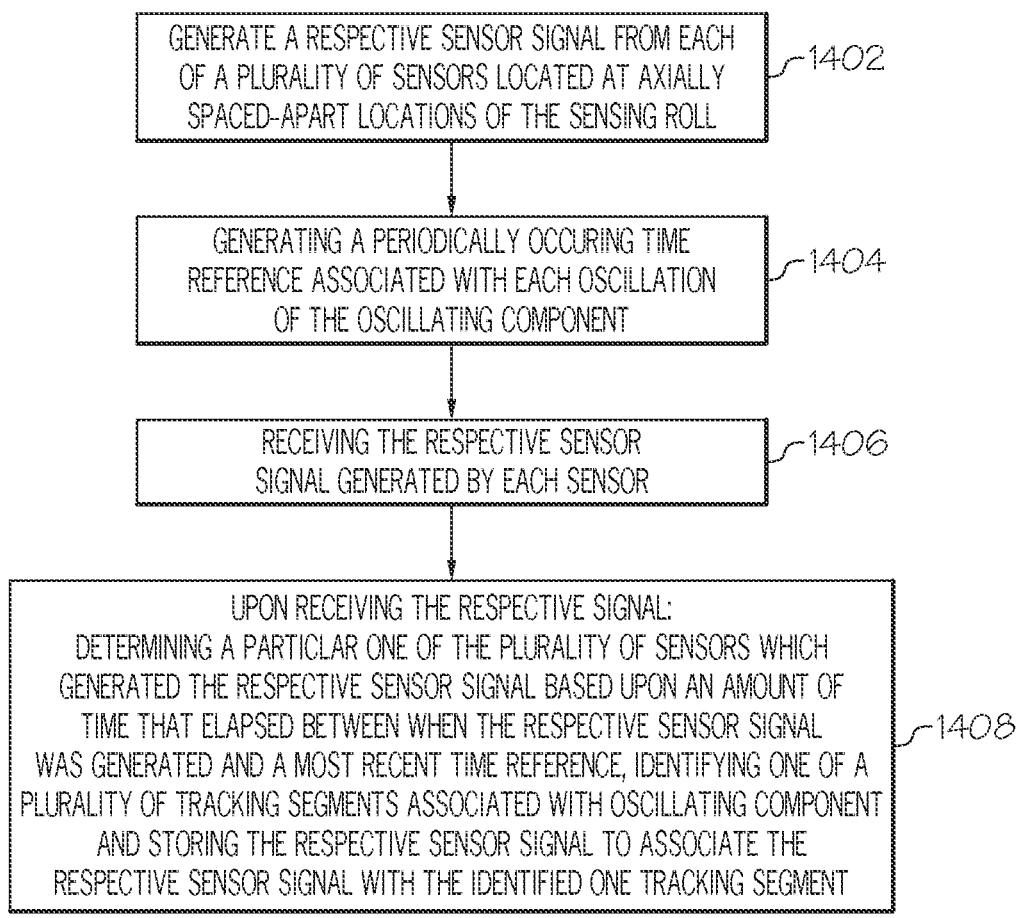
FIG. 14 is a flowchart of an exemplary method of time-synchronizing data in accordance with the principles of the present invention.

FIG. 14 is a flowchart of an exemplary method of time-synchronizing data in accordance with the principles of the present invention. In particular, the method can be associated with a sensing roll and oscillating components such as doctor blades and cleaning showers. The method begins in step 1402 by generating a respective sensor signal from each of a plurality of sensors located at axially spaced-apart locations of the sensing roll. More particularly, each respective sensor signal is generated when each sensor enters a region of a nip between the sensing roll and the mating roll during each rotation of the sensing roll. This is because the sensing roll and mating roll are located relative to one another to create the nip therebetween and there is also a web of material that travels through the nip from an upstream direction to a downstream direction. Furthermore there is an oscillating component arranged to oscillate in a direction transverse to the direction of travel of the web of material. The method continues in step 1404 by generating a periodically occurring time reference associated with each oscillation of the oscillating component. Next, in accordance with the method, the respective sensor signal generated by each sensor is received in step 1406. In step 1408, upon receiving the respective sensor signal, the method involves three different actions: a) determining a particular one of the plurality of sensors which generated the respective sensor signal, b) identifying one of a plurality of tracking segments associated with the oscillating component based upon an amount of time that elapsed between when the respective sensor signal was generated and a most recent time reference, and c) storing the respective sensor signal to associate the respective sensor signal with the identified one tracking segment. Of particular note, each of the plurality of tracking segments can be, respectively, associated with a different amount of elapsed time, a different position of the oscillating component along its path of travel, or a different number of counts that have occurred since a starting reference signal.

It is contemplated that the present invention may be used in combination with the spray head set out in U.S. Pat. No. 2,300,909, entitled "Reciprocating Shower," by Broughton, issued on Nov. 3, 1942 and/or the doctor blade set out in U.S.

Pat. No. 3,863,453, entitled "Oscillator System for Paper Machine," by Mercier, issued on Feb. 4, 1975, the disclosures of which are incorporated by reference herein.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. A system associated with a sensing roll and a mating roll for collecting roll data comprising:
the sensing roll and mating roll located relative to one another to create a nip therebetween, wherein a web of material travels through the nip from an upstream direction to a downstream direction and an oscillating component, upstream from the nip, is arranged relative to the web of material such that it periodically oscillates relative to the web of material;
a plurality of sensors located at axially spaced-apart locations of the sensing roll, wherein each sensor enters a region of the nip during each rotation of the sensing roll to generate a respective sensor signal;
structure for generating a periodically occurring starting reference associated with each oscillation of the oscillating component; and
a processor to receive the periodically occurring starting reference and the respective sensor signal generated by each sensor and, after receiving the respective sensor signal, the processor operates to:
determine a particular one of the plurality of sensors which generated the respective sensor signal,
based upon a value occurring between when the respective sensor signal was generated and a most recent starting reference, identify one of a plurality of tracking segments associated with the oscillating component, wherein each of the plurality of tracking segments is, respectively, associated with a different value, and
store the respective sensor signal to associate the respective sensor signal with the identified one tracking segment.

2. The system of claim 1, wherein the oscillating component comprises a doctor blade.

3. The system of claim 1, wherein the oscillating component comprises a cleaning shower.

4. The system of claim 1, wherein a period of oscillation of the oscillating component is longer than a period of rotation of the sensing roll.

5. The system of claim 1, wherein the received sensor signal comprises a pressure value.

6. The system of claim 1, wherein the processor receives:
the respective sensor signal for each of the plurality of sensors during each rotation of the sensing roll, and
a plurality of the respective sensor signals occurring during a plurality of rotations of the sensing roll.

7. The system of claim 6, wherein, for each one of the plurality of the respective sensor signals, the processor identifies its identified one tracking segment and an associated axial segment of the sensing roll.

8. The system of claim 7, wherein:
the sensing roll comprises n axial segments, having respective index values: 1, 2, . . . , n;
an oscillating component oscillation period comprises m tracking segments, having respective index values: 1, 2, . . . , m, and
wherein there are (n times m) unique permutations that are identifiable by a two-element set comprising a respective axial segment index value and a respective tracking segment index value.

9. The system of claim 8, wherein, for the plurality of respective sensor signals and for one or more of the possible (n times m) permutations, the processor determines an average of all the plurality of respective sensor signals associated with an axial segment and tracking segment matching each of the one or more permutations.

10. The system of claim 1, wherein the structure for generating a periodically occurring starting reference comprises:
a signal generator to generate a trigger signal on each oscillation of the oscillating component when the oscillating component is located at a reference position, wherein the processor identifies the identified one tracking segment relative to the reference position based on a most-recently-generated trigger signal.

11. The system of claim 1, wherein the plurality of tracking segments associated with the oscillating component comprise one of:
a plurality of positions along a path of movement of one oscillation of the oscillating component, and
a plurality of time segments of a period of the oscillating component.

12. The system of claim 1, wherein the oscillating component oscillates in a direction transverse to a travel direction of the web of material.

13. The system of claim 1, wherein the one tracking segment is identified based upon the value and a time period occurring from when a portion of the mating roll, the sensing roll or another element moves from adjacent the oscillating component to the nip.

14. A method associated with a sensing roll and a mating roll for collecting roll data comprising:
generating a respective sensor signal from each of a plurality of sensors located at axially spaced-apart locations of the sensing roll, wherein each respective sensor signal is generated when each sensor enters a region of a nip between the sensing roll and the mating roll during each rotation of the sensing roll; the sensing roll and mating roll located relative to one another to create a nip therebetween, wherein a web of material travels through the nip from an upstream direction to a downstream direction and an oscillating component, upstream from the nip, is arranged relative to the web of material such that it periodically oscillates in a direction transverse to the travel of the web of material;
generating a periodically occurring starting reference associated with each oscillation of the oscillating component; and
receiving the respective sensor signal generated by each sensor and, after receiving the respective sensor signal:
determining a particular one of the plurality of sensors which generated the respective sensor signal,
based upon a value occurring between when the respective sensor signal was generated and a most recent starting reference, identifying one of a plurality of tracking segments associated with the oscillating component, wherein each of the plurality of tracking segments is, respectively, associated with a different value, and
storing the respective sensor signal to associate the respective sensor signal with the identified one tracking segment.

15. The method of claim 14, wherein the oscillating component comprises a doctor blade.

16. The method of claim 14, wherein the oscillating component comprises a cleaning shower.

17. The method of claim 14, wherein a period of oscillation of the oscillating component is longer than a period of rotation of the sensing roll.

18. The method of claim 14, wherein the received sensor signal comprises a pressure value.

19. The method of claim 14, comprising:
receiving the respective sensor signal for each of the plurality of sensors during each rotation of the sensing roll, and
receiving a plurality of the respective sensor signals occurring during a plurality of rotations of the sensing roll.

20. The method of claim 19, comprising:
for each one of the plurality of the respective sensor signals, identifying its identified one tracking segment and an associated axial segment of the sensing roll.

21. The method of claim 20, wherein:
the sensing roll comprises n axial segments, having respective index values: 1, 2, . . . , n;
an oscillating component oscillation period comprises m tracking segments, having respective index values: 1, 2, . . . , m, and
wherein there are (n times m) unique permutations that are identifiable by a two-element set comprising a respective axial segment index value and a respective tracking segment index value.

22. The method of claim 21, comprising:
for the plurality of respective sensor signals and for one or more of the possible (n times m) permutations, determining an average of all the plurality of respective sensor signals associated with an axial segment and tracking segment matching each of the one or more permutations.

23. The method of claim 14, wherein generating a periodically occurring starting reference comprises:
generating a trigger signal on each oscillation of the oscillating component when the oscillating component is located at a reference position, wherein the processor identifies the identified one tracking segment relative to the reference position based on a most-recently-generated trigger signal.

24. The method of claim 14, wherein the one tracking segment is identified based upon the value and a time period occurring from when a portion of the mating roll, the sensing roll or another element moves from adjacent the oscillating component to the nip.

* * * * *